US012447534B2

(12) United States Patent
Biegelsen et al.

(10) Patent No.: US 12,447,534 B2
(45) Date of Patent: *Oct. 21, 2025

(54) PRINTER JETTING MECHANISM AND PRINTER EMPLOYING THE PRINTER JETTING MECHANISM

(71) Applicant: XEROX CORPORATION, Norwalk, CT (US)

(72) Inventors: David K. Biegelsen, Portola Valley, CA (US); Jeng Ping Lu, Fremont, CA (US)

(73) Assignee: XEROX CORPORATION, Norwalk, CT (US)

( * ) Notice: Subject to any disclaimer, the term of this patent is extended or adjusted under 35 U.S.C. 154(b) by 927 days.

This patent is subject to a terminal disclaimer.

(21) Appl. No.: 17/449,028

(22) Filed: Sep. 27, 2021

(65) Prior Publication Data

US 2023/0095803 A1    Mar. 30, 2023

(51) Int. Cl.
*B29C 64/112* (2017.01)
*B22F 12/53* (2021.01)
(Continued)

(52) U.S. Cl.
CPC .............. *B22F 12/53* (2021.01); *C23C 4/123* (2016.01); *C23C 4/185* (2013.01); *B33Y 30/00* (2014.12);
(Continued)

(58) Field of Classification Search
CPC .......... B22F 12/53; B22F 10/22; B22F 12/13; B22F 12/20; C23C 4/123; C23C 4/185;
(Continued)

(56) References Cited

U.S. PATENT DOCUMENTS 4,925,103 A    5/1990   Muench et al.
5,245,244 A    9/1993   Takahashi et al.
(Continued)

FOREIGN PATENT DOCUMENTS

WO    2007/038987 A1    4/2007
WO    2013/050250 A1    4/2013
WO    2017/089176 A1    6/2017

OTHER PUBLICATIONS

Ansell, T.Y, "Current Status of Liquid Metal Printing," Journal of Manufacturing and Materials Processing, Apr. 6, 2021, vol. 5, No. 2, 36 pages, https://doi.org/10.3390/jmmp5020031.
(Continued)

*Primary Examiner* — Jessee R Roe
*Assistant Examiner* — Michael Aboagye
(74) *Attorney, Agent, or Firm* — MH2 Technology Law Group LLP

(57) ABSTRACT

A 3D printer includes an ejector device including a substrate and a plurality of ejector conduits on the substrate. Each ejector conduit includes: a first end positioned to accept a print material and a second end including an ejector nozzle. The ejector nozzle includes a first electrode and a second electrode, and a passageway for allowing the print material to flow from the first end to the second end. A current pulse generating system is in electrical connection with the first electrode and the second electrode of the plurality of ejector conduits. A magnetic field source is proximate the second end of the plurality of ejector conduits so as to generate a flux region disposed within the ejector nozzle of the plurality of ejector conduits during operation of the 3D printer.

32 Claims, 21 Drawing Sheets

(51) Int. Cl.
    *B29C 64/135* (2017.01)
    *B29C 64/209* (2017.01)
    *C23C 4/123* (2016.01)
    *C23C 4/18* (2006.01)
    *B33Y 30/00* (2015.01)

(52) U.S. Cl.
    CPC ... *B81B 2201/036* (2013.01); *B81B 2201/052* (2013.01)

(58) Field of Classification Search
    CPC ... B33Y 30/00; B33Y 10/00; B81B 2201/036; B81B 2201/052; B29C 64/209; B29C 64/112; B41J 2/211
    USPC ......... 222/590, 594, 596, 592, 591; 266/236
    See application file for complete search history.

(56) References Cited

U.S. PATENT DOCUMENTS

| | | | |
|---|---|---|---|
| 5,261,611 A | 11/1993 | Huxford | |
| 5,276,419 A | 1/1994 | Griffin et al. | |
| 5,377,961 A | 1/1995 | Smith et al. | |
| 5,649,992 A | 7/1997 | Carter, Jr. et al. | |
| 5,779,971 A | 7/1998 | Tsung Pan et al. | |
| 6,202,734 B1 | 3/2001 | Sackinger et al. | |
| 6,315,914 B1 | 11/2001 | Silverbrook | |
| 6,378,743 B1 | 4/2002 | Kagan | |
| 8,444,028 B2 * | 5/2013 | Rasa | B22F 9/082 266/236 |
| 8,721,032 B2 | 5/2014 | Kuznetsov et al. | |
| 9,168,549 B2 | 10/2015 | Slot | |
| 9,198,299 B2 | 11/2015 | Ulmer et al. | |
| 9,456,502 B2 | 9/2016 | Rasa | |
| 9,616,494 B2 | 4/2017 | Vader et al. | |
| 10,052,689 B2 * | 8/2018 | Rasa | F15D 1/0075 |
| 10,195,665 B2 | 2/2019 | Sachs et al. | |
| 10,543,532 B2 | 1/2020 | Sachs et al. | |
| 10,589,352 B2 * | 3/2020 | Mark | B22D 31/002 |
| 10,974,320 B2 | 4/2021 | Pan et al. | |
| 11,241,833 B2 | 2/2022 | Gandhiraman et al. | |
| 11,813,672 B2 | 11/2023 | Holcomb et al. | |
| 12,011,760 B2 * | 6/2024 | Biegelsen | B22F 12/53 |
| 12,017,272 B2 * | 6/2024 | Biegelsen | B41J 2/04 |
| 2004/0217186 A1 | 11/2004 | Sachs et al. | |
| 2007/0097180 A1 | 5/2007 | Carlson et al. | |
| 2011/0233239 A1 | 9/2011 | Rasa et al. | |
| 2011/0285792 A1 | 11/2011 | Byun et al. | |
| 2014/0217134 A1 | 8/2014 | Rasa | |
| 2014/0322451 A1 | 10/2014 | Barton et al. | |
| 2015/0273577 A1 | 10/2015 | Vader et al. | |
| 2015/0336170 A1 | 11/2015 | Wagstaff et al. | |
| 2016/0082654 A1 | 3/2016 | Hakkaku | |
| 2016/0107441 A1 | 4/2016 | Joppen et al. | |
| 2016/0236411 A1 | 8/2016 | Ohnishi | |
| 2016/0256888 A1 | 9/2016 | Rasa et al. | |
| 2016/0346998 A1 | 12/2016 | Mark et al. | |
| 2016/0361763 A1 | 12/2016 | Batchelder et al. | |
| 2017/0028467 A1 | 2/2017 | Rasa | |
| 2017/0056966 A1 | 3/2017 | Myerberg et al. | |
| 2017/0087632 A1 | 3/2017 | Mark | |
| 2017/0252829 A1 | 9/2017 | Sachs | |
| 2017/0355138 A1 | 12/2017 | Mark | |
| 2018/0141119 A1 | 5/2018 | Shu et al. | |
| 2019/0061349 A1 | 2/2019 | Kanaris et al. | |
| 2019/0143449 A1 | 5/2019 | Zenou | |
| 2019/0255615 A1 | 8/2019 | Liang | |
| 2019/0375003 A1 | 12/2019 | Mark | |
| 2020/0033751 A1 | 1/2020 | Matsumoto et al. | |
| 2020/0258717 A1 | 8/2020 | Gandhiraman et al. | |
| 2020/0324486 A1 | 10/2020 | Mantell et al. | |
| 2020/0346281 A1 | 11/2020 | Hosek | |
| 2020/0376760 A1 | 12/2020 | Bruggeman et al. | |
| 2021/0070043 A1 | 3/2021 | Tse et al. | |
| 2021/0162493 A1 | 6/2021 | Herrmann et al. | |
| 2021/0178763 A1 | 6/2021 | Chungbin et al. | |
| 2021/0237424 A1 | 8/2021 | Hara et al. | |
| 2021/0245438 A1 | 8/2021 | Xiao | |
| 2021/0323053 A1 | 10/2021 | Gibson et al. | |
| 2022/0062983 A1 | 3/2022 | Schmitt et al. | |
| 2022/0168817 A1 | 6/2022 | Sambhy et al. | |
| 2022/0184948 A1 | 6/2022 | Wong et al. | |
| 2022/0347749 A1 | 11/2022 | Subramanian | |

OTHER PUBLICATIONS

Author Unknown, "Chapter 12—Magnetism and Magnetic Circuits," date unknown, 14 pages.

Author Unknown, "MACOR—Machinable Glass Ceramic for Industrial Applications," date unknown, 6 pages.

Prime Faraday Partnership, "An Introduction to MEMS," published in 2002, Wolfson School of Mechanical and Manufacturing Engineering Loughborough University, 56 pages.

Biegelsen, D.K., "Printer Jetting Mechanism and Printer Employing the Printer Jetting Mechanism," U.S. Appl. No. 17/448,981, filed Sep. 27, 2021.

Biegelsen, D.K., "Method of Jetting Print Material and Method of Printing," U.S. Appl. No. 17/448,991, filed Sep. 27, 2021.

Biegelsen, D.K., et al., "Printer Jetting Mechanism and Printer Employing the Printer Jetting Mechanism," U.S. Appl. No. 17/448,997, filed Sep. 27, 2021.

Biegelsen, D.K., et al., "Method of Jetting Print Material and Method of Printing," U.S. Appl. No. 17/449,006, filed Sep. 27, 2021.

Biegelsen, D.K., "Printer Jetting Mechanism and Printer Employing the Printer Jetting Mechanism," U.S. Appl. No. 17/449,019, filed Sep. 27, 2021.

Biegelsen, D.K., "Method of Jetting Print Material and Method of Printing," U.S. Appl. No. 17/449,021, filed Sep. 27, 2021.

Biegelsen, D.K., et al., "Ejector Device, 3D Printer Employing the Ejector Device and Method of 3D Printing," U.S. Appl. No. 17/449,043, filed Sep. 27, 2021.

Biegelsen, D.K., et al., "Method of Jetting Print Material Using Ejector Devices and Methods of Making the Ejector Devices," U.S. Appl. No. 17/449,046, filed Sep. 27, 2021.

\* cited by examiner

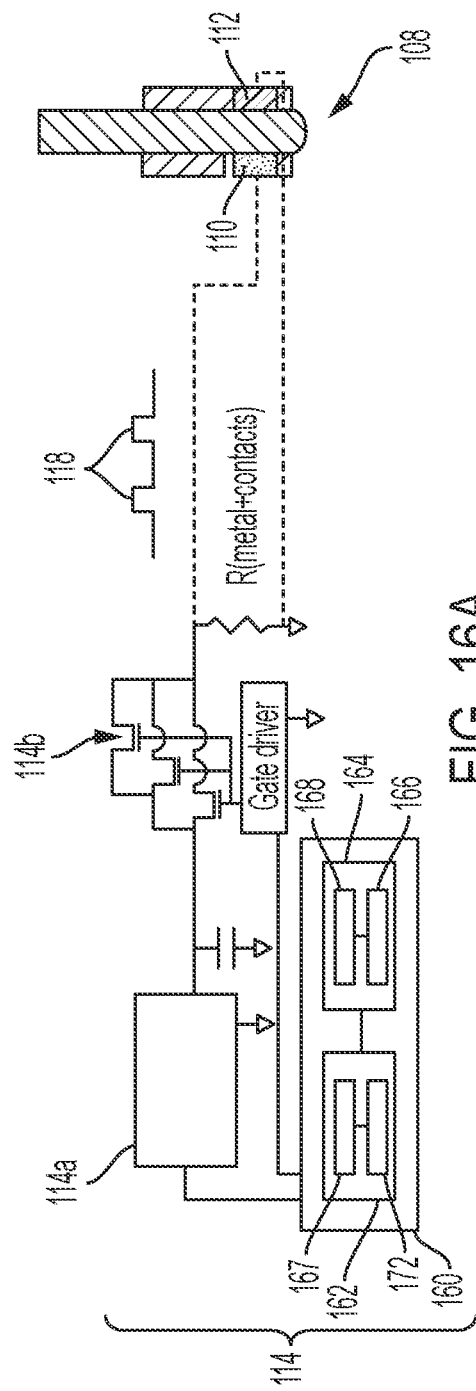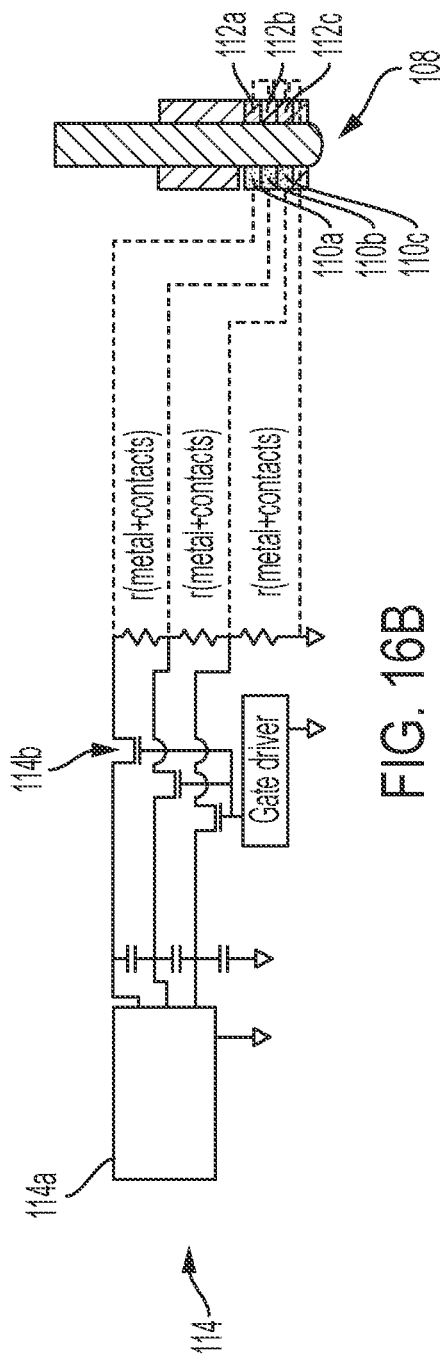
FIG. 16A
FIG. 16B

PRINTER JETTING MECHANISM AND PRINTER EMPLOYING THE PRINTER JETTING MECHANISM

DETAILED DESCRIPTION

Field of the Disclosure

The present disclosure is directed to a printer jetting mechanism that can be employed in printers used for additive manufacturing, referred to herein as three-dimensional ("3D") printers. The present disclosure is also directed to a 3D printer that includes the printer jetting mechanism.

Background

Additive manufacturing, also referred to herein as three-dimensional ("3D") printing of conductive print materials, such as metals, is a known manufacturing technique. As a specific example, three-dimensional printers for building 3D objects from molten aluminum and other metals are known in the art.

One such 3D printer is disclosed in U.S. Pat. No. 9,616,494. The 3D printer works by using DC pulses applied by an electromagnetic coil to expel molten aluminum drops in response. A platen to which the drops are targeted translates to allow for the drops to be connected and built up to produce a three-dimensional object. However, drops of molten aluminum ejected from this 3D printer have diameters of ~0.5 mm or larger. This enables high volume throughput metal part fabrication. However, the relatively large drop size can result in an undesirable degree of porosity of 3D objects printed thereby, as well as uneven build surfaces during fabrication, unwelded drops, and shape inconsistencies. All of these potentially lead to degraded physical properties such as poor tensile strength, as well as poor appearance issues with the final object and/or the inability to print objects with very fine details.

Therefore, methods and systems for improving the quality of three-dimensional objects made from three-dimensional printers, such as, for example, liquid metal printers, would be a step forward in the art.

SUMMARY

An embodiment of the present disclosure is directed to a three-dimensional ("3D") printer. The 3D printer comprises an ejector device comprising a substrate and a plurality of ejector conduits on the substrate, the ejector conduits being arranged in an array. Each ejector conduit comprises: a first end positioned to accept a print material, a second end comprising an ejector nozzle, the ejector nozzle comprising a first electrode and a second electrode, and a passageway for allowing the print material to flow from the first end to the second end, at least one surface of the first electrode being exposed in the passageway and at least one surface of the second electrode being exposed in the passageway. A current pulse generating system is in electrical connection with the first electrode and the second electrode of the plurality of ejector conduits. A magnetic field source is sufficiently proximate the second end of the plurality of ejector conduits so as to generate a flux region disposed within the ejector nozzle of the plurality of ejector conduits during operation of the 3D printer. The 3D printer further comprises a positioning system for controlling the relative position of the ejector device with respect to a print substrate in a manner that would allow the print substrate to receive print material jettable from the ejector nozzle of the plurality of ejector conduits during operation of the 3D printer.

Another embodiment of the present disclosure is directed to a printer jetting mechanism. The printer jetting mechanism comprises an ejector device comprising a substrate and an ejector conduit on the substrate, the ejector conduit comprising: a first end positioned to accept a print material, a second end comprising an ejector nozzle, the ejector nozzle comprising a first electrode and a second electrode, a passageway for allowing the print material to flow from the first end to the second end, at least one surface of the first electrode being exposed in the passageway and at least one surface of the second electrode being exposed in the passageway. The printer jetting mechanism further comprises a current pulse generating system in electrical connection with the first electrode and second electrode of the ejector conduit; and a magnetic field source sufficiently proximate the second end of the ejector conduit so as to generate a flux region disposed within the ejector nozzle during operation of the 3D printer.

Yet another embodiment of the present disclosure is directed to an ejector device. The ejector device comprises: a substrate and an ejector conduit on the substrate. The ejector conduit comprises: a first end configured to accept a print material, a second end comprising an ejector nozzle, the ejector nozzle comprising a first electrode and a second electrode, and a passageway for allowing the print material to flow from the first end to the second end. At least one surface of the first electrode is exposed in the passageway and at least one surface of the second electrode is exposed in the passageway.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

FIG. 16A illustrates an example of a schematic view of an ejector conduit. A current pulse generating system is also illustrated that can be employed to generate a current pulse across electrodes positioned in an ejector nozzle of the ejector conduit, according to an embodiment of the present disclosure.

FIG. 16B illustrates an example of a schematic view of an ejector nozzle. A current pulse generating system is also illustrated can be employed to generate a current pulse across electrodes positioned in an ejector nozzle, according to an embodiment of the present disclosure.

Figure 1:
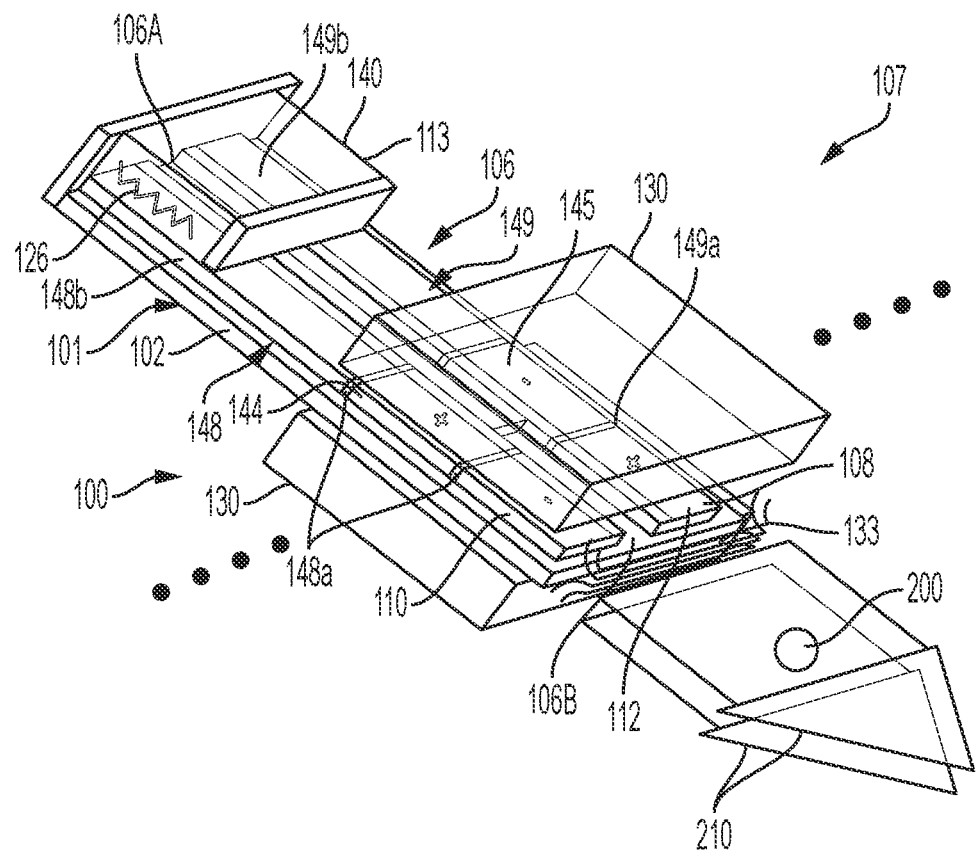
FIG. 1 illustrates a schematic perspective view of a printer jetting mechanism, according to an embodiment of the present disclosure.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific exemplary embodiments in which the present teachings may be practiced. The following description is, therefore, merely exemplary.

The present disclosure is directed to a printer jetting mechanism comprising ejector devices, as well as 3D printers employing the printer jetting mechanism. In an embodiment, any of the ejector devices described herein can be microelectromechanical systems ("MEMS"). The term "microelectromechanical system", or "MEMS", as used herein, is defined as a device that: 1) either has at least one moving part or employs non-moving parts to move a fluid (e.g., a liquid) through the device; and 2) is capable of being fabricated using MEMS fabrication techniques. MEMS fabrication techniques include semiconductor and printed circuit board fabrication techniques, such as film deposition, patterning (e.g., photolithography) and etching techniques.

Methods of employing jetting mechanisms for jetting a print material are also disclosed. The printer jetting mechanism is designed to employ an electrical current and a magnetic field to provide the force for jetting the print material, as will be described in greater detail herein.

The jetting mechanisms and methods of printing disclosed herein can provide one or more of the following advantages: the ability to selectively jet a wide range of metals and other conductive materials; the ability to jet selectable droplet volumes; the ability to jet small droplet sizes that enable printing of fine and/or selectable feature sizes; the ability to mix separate print materials during the jetting process; and the ability to print at relatively high throughputs.

FIG. 1 illustrates an example of a printer jetting mechanism 100, according to an embodiment of the present disclosure. The printer jetting mechanism 100 comprises an ejector device 101 comprising a substrate 102 and an ejector conduit 106 on the substrate 102. The term "on" as used herein is broadly defined to include both direct and indirect physical contact, and thus, for example, includes situations where intervening layers can be formed between the ejector conduits and the substrate. All instances of the term "on" as used herein can optionally be replaced by "directly on" unless the specification makes clear that direct physical contact is not possible.

Any suitable substrate 102 can be employed as part of the ejector devices of the present disclosure. Examples substrates comprise at least one material chosen from insulating materials and semiconductor materials. Examples of insulating materials include polymers (e.g., epoxy or polyimide), ceramics (e.g., alumina) and glass, as well as combinations thereof, such as glass-polymer composites and glass-ceramics. Examples of commercially available glass-polymer composites include glass-epoxy laminates such as: G-10, G-11, FR-4, FR-5 and FR-6, all of which are available from Corning, headquartered in Corning, New York. An example of a commercially available glass-ceramic is MACOR™, which also available from Corning. Examples of semiconductor materials include Group IV semiconductors (e.g., silicon, germanium, SiC or SiGe), Group III-V materials (e.g., GaAs, GaN, GaInAs), or any other suitable semiconductor materials. The substrate can be a single layer or multiple layers. In an embodiment, the surface of substrate 102 on which the passageway 106C is formed is smooth (e.g., a substrate comprising a fiber free material, such as fiber-free polyimide or other fiber-free polymer, rather than a fiber containing material such as FR4). In an embodiment, the substrate 102 has an electrically insulating surface (e.g., a multilayer substrate comprising an electrically insulating surface layer or the entire substrate 102 is an electrically insulating material).

Figure 2:
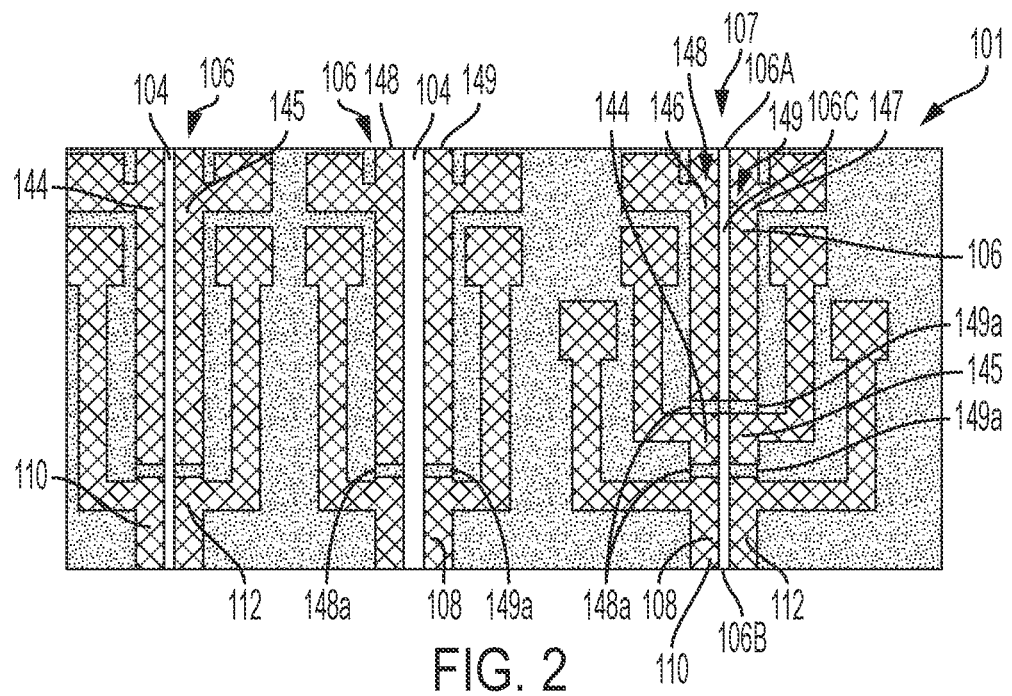
FIG. 2 illustrates a schematic top view of an array of ejector conduits for the printer jetting mechanism, according to an example of the present disclosure.

While an ejector device 101 comprising only a single ejector conduit 106 is shown in FIG. 1, a plurality of ejector conduits 106 can be arranged in an array 107 on substrate 102 to form the ejector device 101, as indicated by the dotted lines arranged laterally from the single ejector conduit in FIG. 1 and as shown in the top view of FIG. 2. Referring to FIG. 1, each ejector conduit 106 comprises a first end 106A positioned to accept the print material 104 from the feeder mechanism 113. A second end 106B comprises an ejector nozzle 108. FIG. 2 illustrates a top view of three ejector conduits 106 arranged in an array 107. A passageway 106C defined by an inner surface of each of the ejector conduits 106 allows the print material 104 to pass through the ejector conduits 106 from the first end 106A to the second end 106B. FIG. 1 also shows a portion of a feeder mechanism 113 for advancing a print material 104 (FIG. 3) to be printed. Exemplary printing materials 104 include molten metals or other materials as will be discussed in greater detail below.

The ejector nozzles 108 comprise at least one pair of electrodes, including a first electrode 110 and a second electrode 112, that are used to supply electrical current to the print material 104. Additional electrodes can optionally be employed, as will be discussed in greater detail herein. At least one surface of the first electrode 110 is exposed in the passageway 106C and at least one surface of the second electrode 112 is exposed in the passageway 106C.

Figure 4A:
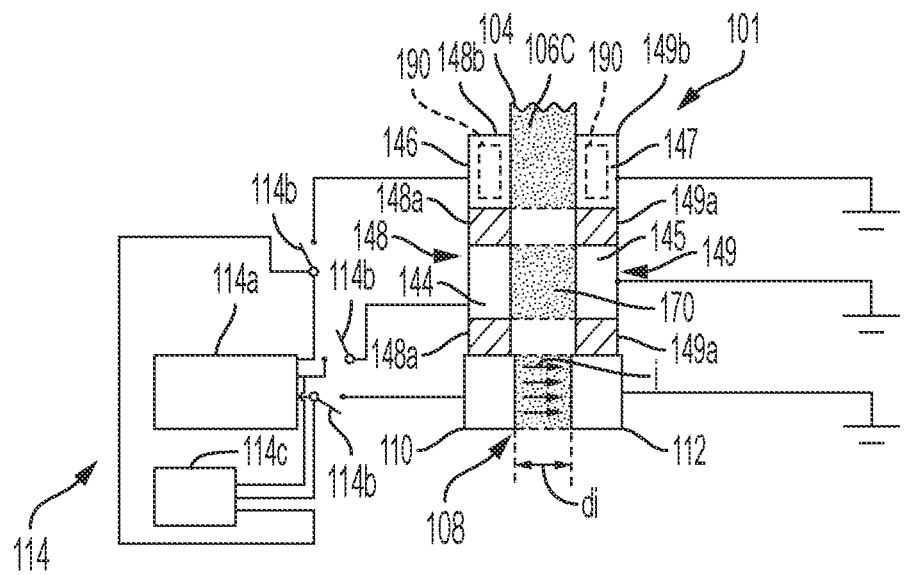
FIG. 4A illustrates a schematic top view of an ejector conduit comprising a plurality of electrode pairs in a rail. A current pulse generating system is illustrated in electrical connection with the first electrode pair as part of an ejector nozzle, according to an embodiment of the present disclosure.

A current pulse generating system 114, shown in FIG. 4A, is in electrical connection with the at least one electrode pair of the ejector nozzle 108 of each of the plurality of ejector conduits 106. The current pulse generating system 114 is capable of causing a pulse of current to flow predominantly between the first electrode 110 and the second electrode 112 through the print material 104 when an electrically conductive print material 104 is positioned in the ejector nozzle 108, thereby generating an electromagnetic force, such as a Lorentz force, on the print material 104 for driving ejection, as discussed in greater detail herein. By varying current pulse characteristics, such as amplitude, pulse length, and/or pulse shape, the current pulse generating system can enable, for example, variable drop volume and variable velocity of ejection of the print material, where both a desired drop volume and velocity of ejection can be selected for each drop during printing.

Figure 5:
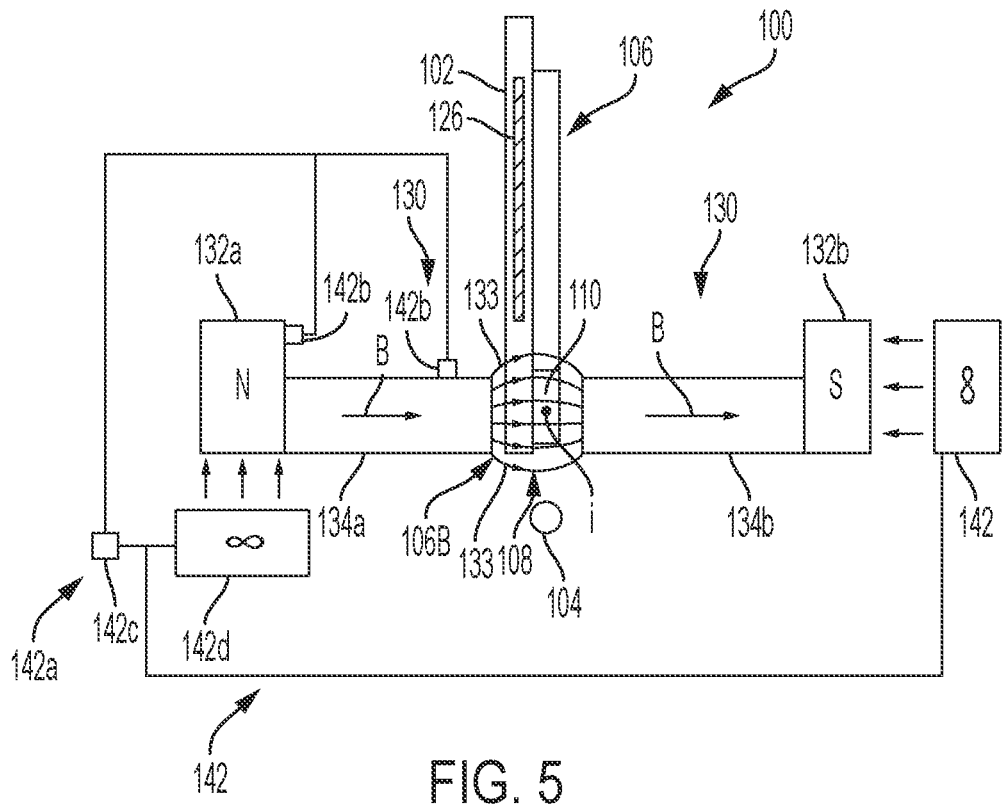
FIG. 5 illustrates a schematic side view of a printer jetting mechanism in which the magnetic field source is a flux circuit comprising a magnet and a flux guide, according to an embodiment of the present disclosure.

As shown in FIGS. 1 and 5, a magnetic field source 130 is proximate the second end, or ejector nozzle 108, of the plurality of ejector conduits 106. The positioning of the magnetic field source 130 proximate the ejector nozzle can provide for a flux region 133 (indicated by flux lines in FIGS. 1 and 5) inside the ejector nozzle 108 between the ends of magnetic field source 130, thereby allowing for certain advantages over positioning the flux region further upstream. For example, an advantage is that the electromagnetic force acts on a reduced mass (e.g., effectively just the mass of print material 104 within the current pulse carrying region between electrodes 110, 112 and the ejector nozzle 108 exit), thereby allowing for a higher peak ejection velocity of print material 104 for a given current. On the other hand, if the electromagnetic force generating magnetic field source 130 and electrodes 110, 112 were placed farther upstream in the ejector conduit 106, the same current pulse would accelerate a longer column of print material 104 to a lower peak velocity. For purposes of the present disclosure, the term "flux region" or "magnetic flux region" is any region within the passageways of the ejector conduits 106 that has a magnetic flux density that is greater due to the proximity of the magnetic field source 130, then if the magnetic field source 130 were not present, where the flux density is measured in air (e.g., empty passageway) at room temperature (22° C.).

The magnetic field source 130 is configured to provide a magnetic field that is substantially perpendicular to the flow of electric current through the conductive print material 104 during operation of the ejector nozzle 108, thereby generating an electromagnetic force, such as a Lorentz force, on the conductive print material 104 in the ejector nozzle 108. The flow path of electric current through print material 104 will be determined by the placement of electrodes along the ejector conduit (e.g., electrodes 110, 112 or any of the other electrode pairs described herein). The magnetic field source 130 can comprise any suitable type of magnet 132 that can provide the desired magnetic field, such as a permanent magnet or electromagnet.

Figure 6:
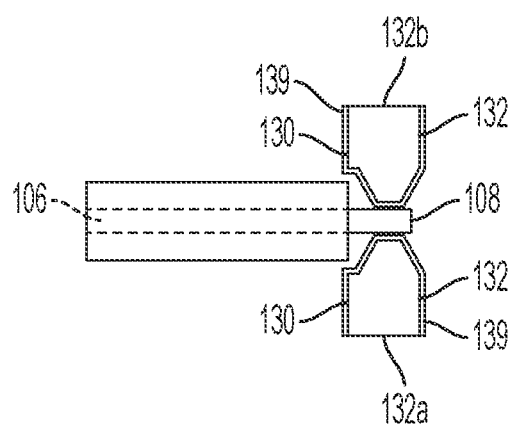
FIG. 6 illustrates a schematic side view of a printer jetting mechanism, according to an embodiment of the present disclosure.

FIG. 6 illustrates an example in which magnetic field source 130 can be one or more magnets 132, which can be permanent magnets or other type of magnets (e.g., electromagnets) comprising a north pole 132a and a south pole 132b that are each positioned proximate opposing sides of the ejector conduits 106. The north pole 132a and south pole 132b as shown in FIG. 6 can be from the same magnet or two different magnets.

In another embodiment, as shown in FIG. 5, the magnetic field source 130 is a flux circuit comprising a magnet 132 for providing a magnetic flux density, B, and a flux guide 134. In an example, a first portion of the flux guide 134a is attached to a north pole 132a of a magnet 132 (FIG. 5). A second portion of the flux guide 134b is attached to a south pole 132b of a magnet 132. North pole 132a and south pole 132b can be, for example, two ends of the same magnet, or two ends of two different magnets. Opposing ends of the portions of flux guide 134a and 134b are positioned proximate the ejector nozzles 108 and conduct or guide the magnetic flux so as to immerse the ejector nozzle 108 in the desired magnetic field. The magnet 132 can be any magnetic field generating device, such as a permanent magnet or electromagnet.

For purposes of the present disclosure, the term "flux guide" can be taken to mean any member or other device that is capable of constraining the path of magnetic flux and guiding it to a target volume. In an embodiment, the flux guide 134 is a member comprising any suitable material for guiding magnetic flux. As an example, the flux guide is a member shaped to carry magnet flux from the magnetic field generating device to a desired target volume and that comprises a material that has one or both of high permeability and high magnetic saturation at the operation temperatures in the vicinity of the ejector nozzle 108. In an example, the material can have the desired magnetic saturation (e.g., about 0.1 to about 2 Teslas, such as about 0.5 to about 2 Teslas) at the desired operating temperatures, such as any of the operating temperatures described herein. Examples of such materials include nickel, nickel alloys, cobalt, cobalt alloys, iron and iron alloys, where the alloys can include combinations of nickel, cobalt and/or iron, as well as other materials, such as silicon (e.g., silicon iron and silicon steel). Any other type of magnetic flux guide can also be employed.

When a current, i, (represented by a dot and flowing in a direction into or out of the page in FIG. 5) is pulsed through a conductive print material 104 between electrodes 110, 112 in ejector nozzle 108, the current flow being in an averaged direction that is substantially perpendicular (e.g., perpendicular or within 10% of perpendicular) to the averaged direction of the magnetic field of flux region 133, (averaged direction shown as flux density, B), a Lorentz force is generated on the conductive print material 104 through which the current flows. For illustration purposes, the averaged direction of current, i, shown as a dot in FIG. 5, is into the page. One of ordinary skill in the art would understand that the realized force on the liquid in an ejector conduit can be calculated as an integral of i(xyz) x B(xyz) over the volume of liquid where i and B intersect, where x, y and z represent the Cartesian Coordinates describing that volume. The term "averaged direction" as used here is meant to indicate an approximated average direction of current and an approximated average direction of magnetic flux over the entire volume of liquid print material in the region where i and B intersect in an ejector conduit. One of ordinary skill in the art would understand how to determine averaged directions for flux density and current.

Generally speaking, the Lorentz force will be proportional to the cross-product of the current, i, and the flux density, B. Therefore, the higher the flux density of the magnetic field at the region of the ejector nozzle 108 where the current is pulsed through the print material 104, the higher the Lorentz force on the print material 104 given a constant current pulse amplitude. Therefore, providing a higher magnetic flux density can allow for a smaller current pulse amplitude while still providing a desired ejection force for the print material 104. It is to be understood that Lorentz forces are described herein as one example of an electromagnetic force that can be used to drive ejection, any other suitable electromagnetic force for driving ejection can be employed.

Figure 4B:
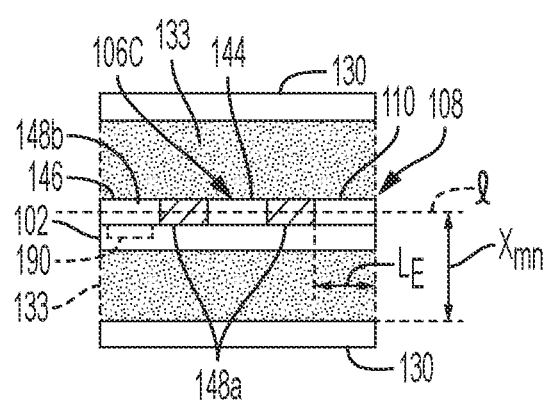
FIG. 4B illustrates a schematic side view of the ejector conduit showing the relation of a magnetic field source 130 with respect to the ejector conduit of FIG. 4A, according to an embodiment of the present disclosure.

The flux density realized at the current pulse region of the ejector nozzle 108 will be dependent on the magnetic field strength of the magnetic field source 130, the proximity of the magnetic field source 130 to the current pulse region, the shape of any flux guide, and the nature of the medium through which the magnetic field extends (e.g., the type of conductive print material 104). In an embodiment, the magnetic field source 130 is positioned in relatively close proximity to the current pulse region of the ejector nozzle 108 in order to provide the desired flux density. This can be accomplished by positioning either the magnet 132 or flux guide 134 of the magnetic field source 130 sufficiently close to the nozzles 108 to provide a desired magnetic flux density of, for example, about 0.1 to 2 Teslas, such as 0.5 to 2 Teslas. Example distances, $X_{mn}$, (FIG. 4B) between the magnetic field source 130 and a longitudinal axis, ι, of the passageway 106C of the ejector nozzles 108 include ranges of from about 0.1 mm to about 10 mm, such as about 0.5 mm to about 5 mm, or about 1 mm to about 2 mm, where $X_{mn}$ is the closest distance between: 1) the longitudinal axis, ι, of passageway 106C of the ejector nozzle 108 and 2) either the magnetic field source 130, such as the magnet 132 if there is no magnetic flux guide, or the flux guide 134, in the case where the magnetic field source 130 is a flux circuit.

The ejector nozzles 108 may operate at or above the melting temperature of the conductive print materials being ejected. These temperatures will often be over 400° C. Such high temperatures can result in reduced magnetic strength and/or complete loss of magnetism for many magnetic materials. An advantage of employing a flux circuit comprising a magnet 132 and a flux guide 134 as the magnetic field source 130 is that the magnet 132 can be maintained a distance from the ejector nozzles, thereby allowing the magnet to more easily be kept at a reduced operating temperature compared with the temperatures proximate the ejector nozzles 108.

If desired, a cooling system 142 (FIG. 5) for cooling the magnetic field source 130 can also be employed, either for cooling magnet 132 employed alone or with a flux guide 134, in order to maintain the magnet 132 (and optionally the flux guide 134) within desired operating temperatures so as to avoid reductions in magnetic field strength. Any suitable cooling system 142 can be employed, such as a forced fluid cooling system in which a cooling gas and/or cooling liquid is circulated by a mechanical system 142d comprising, for example, a fan, blower, compressor, pump, radiator or other heat exchanger, or any combination thereof, to cool the magnetic materials. Examples of such systems can include refrigeration systems, forced air systems and systems for flowing water to cool the magnet (e.g., a radiator and heat conduction path from magnetic materials to the water or other fluid cooled by the radiator). In an example, the cooling system 142 can comprise a feedback loop 142a that includes one or more temperature sensors 142b (e.g., thermocouples) positioned proximate the magnet and/or the flux guide for determining temperature of the magnet/flux guide and a controller 142c (e.g., manual controller or automated controller having a computer processor) for increasing or decreasing the cooling output of the mechanical system 142d (e.g., fan, blower, compressor, pump, radiator or other heat exchanger or combination thereof) of the cooling system to maintain a desired temperature. Any other suitable cooling system 142 can be employed for cooling the magnet 132 and/or flux guide 134. In addition to or in place of cooling system 142, the magnets and/or flux guides can be thermally isolated from heat from the ejector conduits by any suitable insulator. FIG. 6 illustrates an example of a suitable insulator 139, which can comprise, for instance, one or both of a thermal insulating material or an evacuated chamber positioned between the ejector conduits and the magnets and/or flux guide. For instance, insulator 139 can optionally include a thin vacuum gap, represented by the space shown in the insulator 139, the vacuum gap being disposed between an outer chamber wall or layer and the magnetic field source 130, where the outer chamber wall or layer are represented by the outer line of insulator 139.

Figure 7:
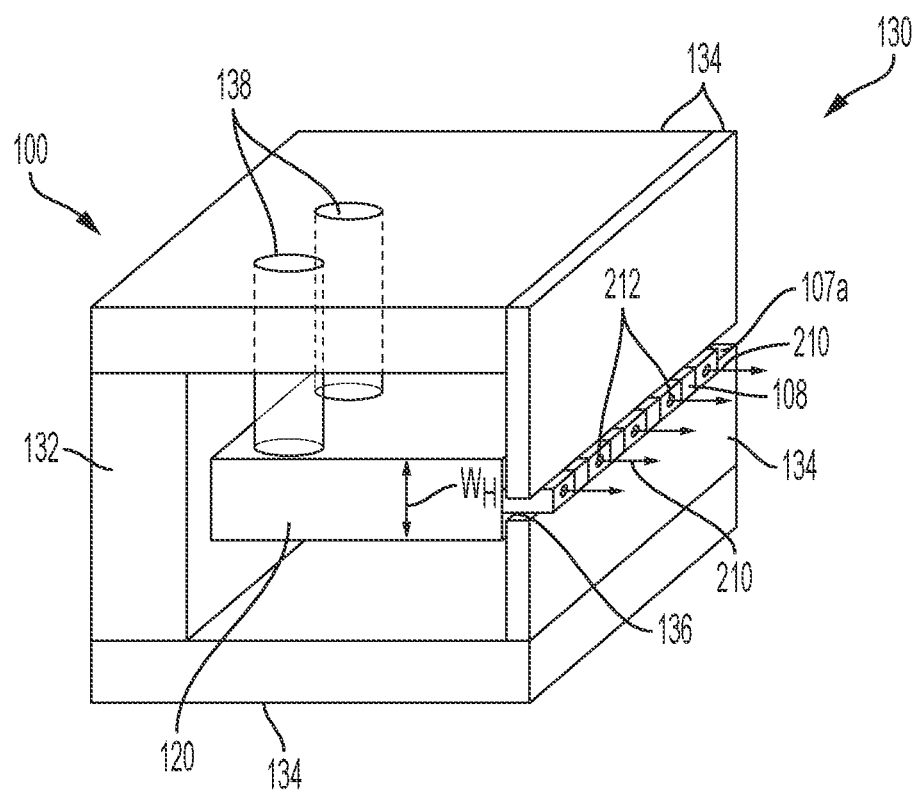
FIG. 7 illustrates a schematic, perspective view of a printer jetting mechanism in which the magnetic field source is a flux circuit comprising a magnet and a flux guide, according to an embodiment of the present disclosure.

An example of a flux circuit comprising a magnet 132 and a flux guide 134 is shown in FIG. 7. The flux guide 134 is configured as a closed flux loop everywhere except in gap 136 in which the ejector nozzles 108 of the array 107 (FIG. 8) are positioned so as to allow ejection of print material 104. Ejector nozzles 108 are positioned in an extended portion 107a of array 107 that has a width dimension, $W_E$, that is shorter than a width dimension, $W_H$, of the ejector housing 120, so as to fit within the gap 136, thereby decreasing the distance between the flux guide 134 and the pulse region in the ejector nozzles 108. This can allow for an increased flux density in the pulse region, which has the advantage of allowing for a reduced current while providing for a desired ejection force on the print material, as discussed herein. As examples, $W_E$ can range from about 0.2 mm to about 10 mm, or about 0.5 mm to about 2 mm, and $W_H$ can range from about 0.5 mm to about 100 mm, or about 1 mm to about 10 mm. As another example, $W_E$ can range from about 70% to about 1% the size of $W_H$, or about 50% to about 10%. Pass through conduits 138 can provide a flow of print material 104 to the array 107 as part of a feeder mechanism.

In an embodiment, the magnetic field source 130 is not integrated into the array 107. For example, the magnetic field source 130 can be positioned proximate to the array, without being incorporated within the array of ejector conduits itself. In an embodiment, the magnetic field source 130 is positioned on opposing sides of ejector nozzles 108, and parallel with the length of the array of nozzles, as shown, for example, in FIGS. 1 and 7. This arrangement allows the ejector nozzles of a given row of the array to be more densely packed, at least because the magnetic field source 130 is not positioned between the ejector conduits 106 of any given row.

Referring to FIG. 4A, the ejector nozzle 108 has an inner width, $d_i$, which is the length of the shortest straight line between opposing electrodes 110 and 112, as shown in FIG. 4A. If there is more than one possible value for $d_i$ (e.g., such as if the value for $d_i$ varies along the length of the ejector nozzle 108), then the $d_i$ is the smallest of the possible $d_i$ values for the ejector nozzle 108. Example values for $d_i$ include, for example, from about 10 microns to about 1000 microns, from about 20 microns to about 500 microns, from about 50 microns to about 200 microns, or about 100 microns. In an embodiment, $d_i$ ranges in size from about 10 microns to less than 100 microns, about 10 microns to about 90, 80, 70 or 50 microns, or about 10 microns to about 25 microns. A length, $L_E$, (FIG. 4B) of the first electrode 110 and second electrode 112 (or the combined length of the plurality of electrode pairs if multiple electrode pairs are employed, such as in FIG. 16B) can be any suitable length, such as, for example, from about 1 to about 10 times the inner width, $d_i$ (e.g., diameter). Examples of suitable values for length, $L_E$, are about 10 microns to about 5000 microns, such as about 10 microns to about 1000 microns, such as about 10 microns to about 500 microns, or about 15 microns to about 100 microns (e.g., 90, 80, 70 microns or less). In an embodiment, the electrodes 110, 112 are positioned entirely in the ejector nozzle 108 and/or are positioned at the tip (e.g., the end most position) of the ejector nozzle 108.

The ejector nozzle 108 is an end most portion of ejector conduits 106 and has a length, $L_n$, (FIG. 8) ranging, for example, from about 1 to about 10 times the inner width, di (e.g., diameter) of the ejector nozzle 108. In other examples, the length, $L_n$, of the nozzle ranges, for example, from about 1 to about 5 times di, about 1 to about 3 times di, about 1 to about 2 times di, or is about equal to di. In an embodiment, the length, $L_E$, of the electrode is about equal to the length, $L_n$, of the ejector nozzle.

Referring again to FIGS. 1 and 5, sufficient current is provided to electrodes 110, 112 to provide the desired momentum to eject, or jet, at least a portion of the print material 104 from the ejector nozzles 108. The amplitude and length of current pulse can be determined by one of ordinary skill in the art.

In an embodiment, one or more of the plurality of ejector conduits 106 each comprise a third electrode 144 and a fourth electrode 145, as shown for example in FIG. 1. At least one surface of the third electrode 144 is exposed in the passageway 106C and at least one surface of the fourth electrode 145 is exposed in the passageway 106C. The third electrode 144 and the fourth electrode 145 are together sometimes referred to herein as a second electrode pair.

Having multiple electrode pairs in a given pathway allows various benefits. One benefit is the ability to supply current in parallel through multiple leads. If lead series resistance represents a significant voltage drop (and therefore demands a high voltage current source) or presents an undesirable power dissipation because of lead cross sections available, then supplying the current through multiple leads to multiple electrode pairs can be beneficial. The power dissipation is proportional to current squared ($I^2$), so having N electrode pairs potentially reduces the dissipation in each pair by $N^2$, as compared with using a single electrode pair for the same total current. More interestingly, providing the capability to select different numbers of electrode pairs for each drop of print material ejected can enable higher forces to be applied selectively—if the current per electrode is limited.

In an embodiment, one or more of the plurality of ejector conduits 106 each comprise a fifth electrode 146 and a sixth electrode 147, as shown, for example, in the right most ejector conduit 106 of FIG. 2. At least one surface of the fifth electrode 146 is exposed in the passageway 106C and at least one surface of the sixth electrode 147 is exposed in the passageway 106C. The fifth electrode 146 and the sixth electrode 147 are together referred to herein as a third electrode pair.

The electrode pairs can be configured to form portions of rails that provide sidewalls of the passageway 106C and/or that can be used to guide molten print material through the ejector conduits 106, such as by wicking of the print material by providing surfaces that are wettable along the length of the passageway 106C, as described herein. The rails can extend the entire length, or substantially the entire length, of the passageway 106C. In an embodiment, referring to FIGS. 1 and 2, a first rail 148 and a second rail 149 are disposed proximate the passageway 106C, so that at least a portion of the passageway 106C is positioned between the first rail 148 and the second rail 149. The first rail 148 comprises the first electrode 110 and optionally one or both of the third electrode 144 and the fifth electrode 146 (shown in FIG. 2). The second rail 149 comprises the second electrode 112 and optionally one or both of the fourth electrode 145 and the sixth electrode 147.

Portions of the rails 148 and 149 comprise an insulating material. For example, insulative portions 148a, 149a of rails 148 and 149 can be positioned between the electrodes and comprise an insulating material for electrically insulating the electrodes from other electrodes in the rail. Additionally, portions 148b, 149b of rails 148 and 149 can comprise either an insulating material or a floating metal layer (e.g. an electrically isolated metal layer that does not form an electrode).

The material of the rails 148, 149 can be chosen to provide good capillary flow of the print material 104. For example, metal electrodes and floating metal layers are more easily wetted by molten metal print material than are non-metal rail materials. In other words, during printing operations the print material 104 will have a contact angle with the metal portions of rails 148, 149 that is generally less than the contact angle of the print material with the non-metal portions. Therefore, employing metal electrodes and floating metal layers as the material for rails 148, 149 allows the print material to wick along, and thus more easily flow through, passageway 106C due to capillary forces.

Where non-metal (e.g., insulator or semiconductor) materials are employed, the non-metal materials can optionally be chosen to have a desired effect on the flow of the print material through the passageways. Almost all electrically insulating materials have a molten metal contact angle greater than 100 degrees, although values depend on the print material, temperature, atmosphere and surface roughness, among other things. For example, Aluminum wetting angle on alumina varies from ~140 degrees at 750° C. to ~90 degrees at 1000° C. Semiconductor materials, such as silicon or germanium, generally have contact angles with molten metal print material that are between those of solid metals and insulators. Lower contact angles will allow for easier flow through passageways 106C, while higher contact angles will impede flow. Contact angles over 90° will impede flow of print material through passageways 106C, while contact angles less than 90° will increase flow of print material.

Thus, both metal and non-metal materials can be selected based on their contact angles with the print material at the operating conditions so as to aid in tuning the pressures needed to control metal flow in passageway 106C. Employing metals and other materials with relatively low contact angles (e.g., of 90° or less) in the rails can reduce or eliminate the need for using external forces, such as pressure applied by pumps or hydrostatic pressure, to provide for the desire flow rate of print material 104 through passageways 106C, compared with an embodiment that employs materials, such as insulating materials, with contact angles greater than 90° for large portions (e.g., portions 148b, 149b) of rails 148, 149. Insulating materials, such as for insulative portions 148a, 149a, can be chosen to impede the flow of print material 104 for any desired reason, such as to reduce or prevent unwanted or uncontrolled flow through the flow channel due to capillary effects. Any of the optional electrode pairs employed in the devices of the present disclosure other than electrodes 110 and 112 (e.g., optional electrodes 144, 145 and 146, 147, as well as the second, third, fourth and fifth electrode that will be described with respect to FIG. 12) can be replaced with floating metal layers or non-metal materials (e.g., insulating or semiconductor materials, such as any of the semiconductor or insulating materials described herein), as desired.

Figure 3:
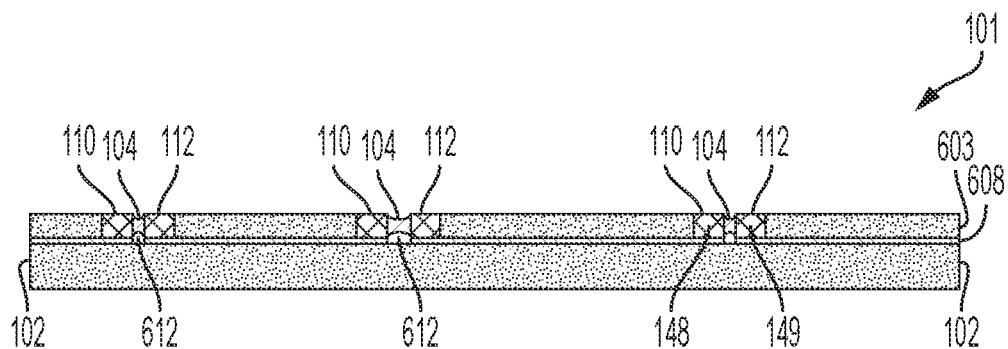
FIG. 3 illustrates a schematic side view of an array of ejector conduits, according to an embodiment of the present disclosure.

In an embodiment, as shown in FIG. 3, the print material 104 is contained substantially, or solely, between the rails 148, 149. Due to the ability of the print material 104 to wet the sidewalls of rails 148 and 149, the print material 104 may optionally be suspended between the rails 148 and 149 and above the bottom of the passageway 106C, as indicated by the gaps 612, which can be filled with a gas, such as, for example: air; a reducing gas, such as a forming gas comprising hydrogen and nitrogen; or an inert gas, such as nitrogen or argon. In such an embodiment, the bottom of passageway 106C comprises a non-metal material (e.g., a semiconductor or insulating material), such as a material that is non-wettable or that has low wettability with the molten metal print material in order to reduce contact of the print material with the bottom of the passageway and thereby enhance suspension of the print material between the rails 148, 149. For example, the material between rails 148, 149 can be chosen to be a non-metal (e.g., insulating material or semiconductor material) having a contact angle with the print material of greater than 90°, such as 100° to 180°. The specific contact angle realized will depend on the type of print material being printed, among other things, as described herein. The embodiment illustrated by FIG. 3 can allow for a well defined print material volume, or more controlled volume between the electrodes, and/or smaller droplet volumes than if print material flow were not limited to space between the electrodes. Further, because contact of the print material 104 is largely, or solely, with the rails 148, 149, which in embodiments can largely comprise metal surfaces that are wettable by molten metal print materials, this design can result in less drag on the print material 104 as the print material flows through passageway 106C than if print material flow were not limited to the space between the electrodes.

Figure 9:
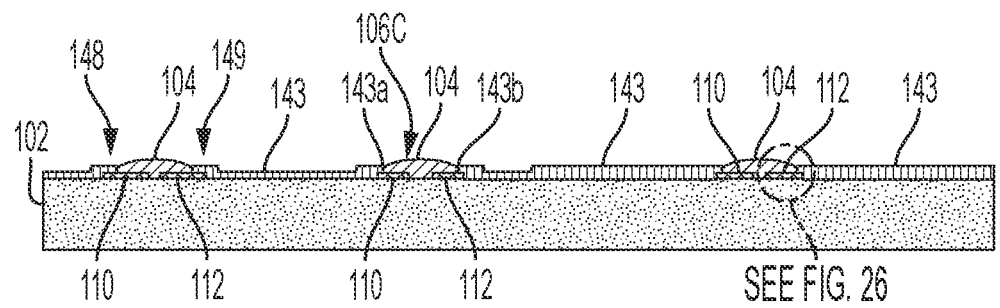
FIG. 9 illustrates a schematic side view of an ejector nozzle array, according to an embodiment of the present disclosure.

FIG. 9 illustrates an embodiment in which a sidewall layer 143 comprises an insulating material that is disposed proximate the first rail 148 and the second rail 149. The insulating material can comprise any electrically insulating material described herein. The sidewall layer 143 is patterned to form a first sidewall 143a and a second sidewall 143b. A distance between the first sidewall 143a and the second sidewall 143b defines a width of the passageway 106C through which the print material flows. In an embodiment, the sidewall layer 143 is used to bound and thereby retain the print material 104 (e.g., a molten metal) in the passageway 106C. Materials for sidewall layer 143 (FIG. 9) that can provide good bounding function for molten metal print material are selected to be refractory and electrically insulating.

Any suitable insulating materials can be employed for sidewall layer 143. Examples insulating materials include metal oxides, such as aluminum oxide, magnesium oxide and silicon oxide (e.g., silicon dioxide); metal oxynitrides, such as silicon oxynitride or aluminum oxynitride; metal nitrides, such as aluminum nitride, silicon nitride or boron nitride; metal carbides, such as silicon carbide; and polymers, such as epoxy or polyimides, as well as combinations of any of these materials. It is noted that the terms "metal oxide(s)", "metal nitride(s)", "metal oxynitride(s)" and "metal carbide(s)" can include silicon and other semiconductor materials, such as germanium, as the metal portion of the compound. However, semiconductors, such as silicon and germanium, are generally considered to be non-metals for purposes of this disclosure, unless, as here, it is expressly stated otherwise.

The insulating sidewall materials can optionally be chosen to provide capillary benefits, confinement benefits for the print material flow, or a balance between the two. Insulating materials with improved capillary benefits allow reduced impedance to flow of print materials within passageways 106C due to relatively lower contact angles (e.g., contact angles closer to 90° or less, such as about 145° to about 80°). Insulators with improved confinement benefits, on the other hand, allows for improved confinement for bounding of the print material between the insulating sidewalls, which can be beneficial in reducing or preventing overflow of print material from sidewall boundaries in open channel configurations. Improved confinement benefits are due to relatively greater contact angles (e.g., contact angles closer to 180°, such as about 145° to about 180°), although any contact angle of greater than 90° will provide some degree of confinement benefits. The contact angle for the insulating materials will depend on the specific print material, among other things.

For any insulating material, the contact angle of a molten metal print material on the insulating material can also be reduced by electrowetting. The concept of electrowetting is generally well known. Electrowetting occurs when a voltage is applied to an electrode below the insulating layer, which induces charge accumulation in the molten metal print material next to the insulating material. For example, referring to FIGS. 4A and 4B, in an embodiment where electrode pair 146, 147 are replaced with an insulating material as a portion of the rail (e.g., portions 148b, 149b of FIG. 1), optional electrodes 190 (shown by dashed lines) connected to a voltage source (not shown), can be in contact with the insulating material that is portions 148b, 149b. The charge wants to spread out and does so by increasing the wetting area, thereby resulting in a lower contact angle between the insulating layer (e.g., portion 148b, 149b) and the molten metal print material. A lower contact angle between the molten metal and the insulating layer aids capillary filling of the passageway. As described herein, a controlled pressure head can also optionally be employed to induce filling of the passageways with molten metal, either in combination with low contact angle materials (e.g., metal electrodes, floating metal layers and/or insulating materials employed with electrowetting, as described herein) or to allow for use of higher contact angle materials in the passageways.

In an embodiment, as shown in FIG. 9, the rails 148, 149 comprise electrodes 110, 112 and optional electrodes 144-147 (FIG. 2) and have a width that is greater than their thickness. The relatively wide, thin electrodes allow for increased surface area for wicking of the print material by the wettable electrode materials while still retaining a relatively low series resistance. The sidewall layer 143 is formed to have a sidewall positioned so that a top surface of the rails 148, 149 are exposed, as shown, for example, in FIGS. 9 and 10. This can allow the print material 104 to flow over the portions of rails 148, 149 positioned between the sidewalls 143a and 143b, as well as between the rails 148, 149.

Figure 26:
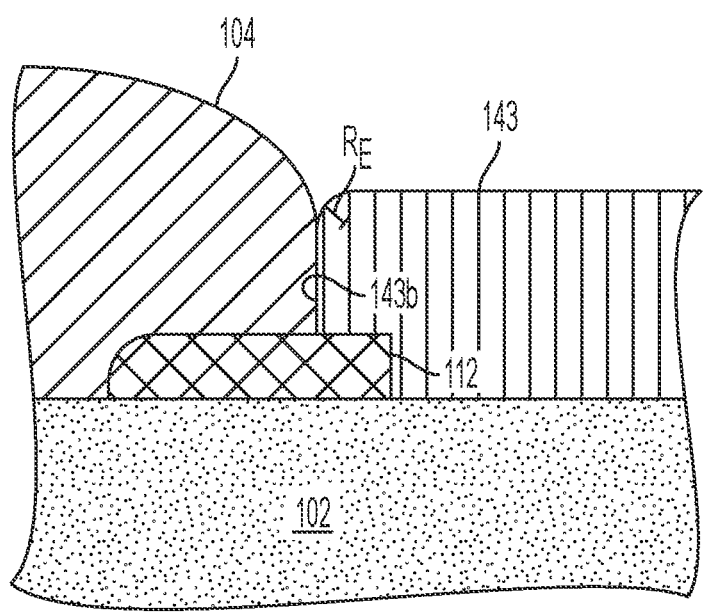
FIG. 26 shows an enlarged view of a sidewall 143b of FIG. 9, according to an embodiment of the present disclosure.

The shape of the electrodes, other portions of the rails and/or sidewalls in the various embodiments described herein can be used to control whether or not flow of the print material is maintained within desired boundaries of the passageways. For instance, a sharp edge can potentially impede overflow of print material onto the top surface of the electrodes or sidewalls of any of the passageways described herein, whereas rounded edges will more easily allow the print material to flow over an edge. As an example, sharp edges of the sidewalls 143a, 143b of the devices illustrated in FIGS. 9 and 10, as well as the sharp edges of the electrodes and other portions of the rails 148, 149 in the devices of FIGS. 2 and 3, can help stop undesired overflow. Referring to a cross-sectional view of FIG. 26, suitably sharp edges can have an average radius of curvature, $R_E$, at each point along the edge, that is small enough to provide the desired impedance of flow over the edge. The average radius of curvature accounts for the curve of the edge at any given cross-section not being perfectly circular. One of ordinary skill in the art would be able to determine the average radius of curvature. The desired values for $R_E$ will depend on the type of print material and the type of material the sidewall material is made of, among other things. Examples of suitable values for $R_E$ include values less than about 50 microns, such as about 1 micron to about 50 microns, or about 5 microns to about 50 microns. If overflow is desired, rounded edges with suitably large radius of curvatures can be employed.

Figure 25A:
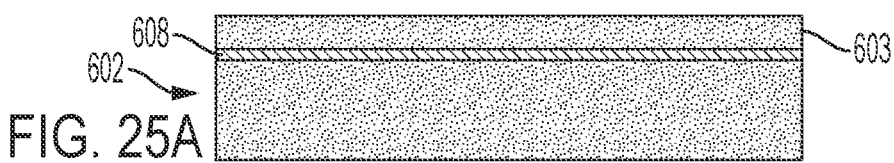
FIG. 25A illustrates a cross-sectional, side view of a partially made array of ejector conduits, according to an embodiment of the present disclosure.

In other embodiments, the entire top-most surface of the electrodes can be coated with non-wetting or lower wetting material, as compared to the wettability of the electrodes, to impede flow of print material out of the passageways. For example, a sidewall layer 143 comprising any of the insulating materials, or combinations of the insulating materials, described herein can cover all or a portion of the top surface of any of the electrode pairs, as shown in FIGS. 9 and 25E. Alternatively, all of the top surface of the electrode pairs can remain as bare metal, as shown in FIGS. 3 and 10, for example.

Figure 10:
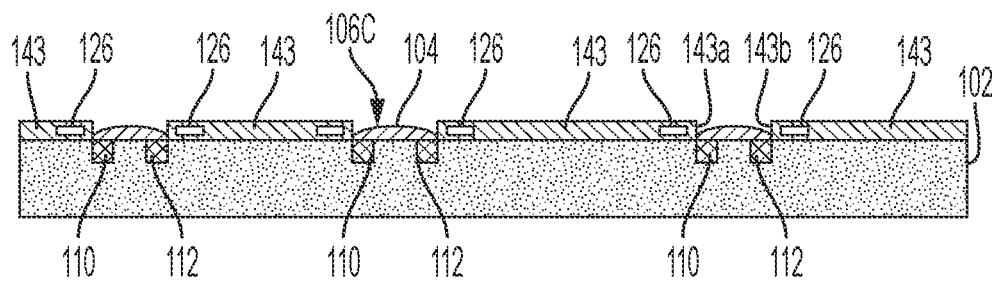
FIG. 10 illustrates a schematic side view of an ejector nozzle array, according to an embodiment of the present disclosure.

FIG. 10 illustrates an embodiment in which a sidewall layer 143 is disposed proximate the first electrode 110 and the second electrode 112. The sidewall layer 143 is patterned to form a first sidewall 143a and a second sidewall 143b. The distance between the first sidewall 143a and the second sidewall 143b defines a width of the passageway 106C. The electrodes 110, 112 are buried in a trench in the substrate 102 so that the print material flows over but not substantially between the electrodes. The sidewall layer 143 can comprise any suitable insulating materials, including any of the insulating materials, or combination of insulating materials, described herein. The insulating material can optionally be selected to have a desired contact angle with the print material so as to provide confinement and/or capillary benefits, as discussed herein.

In an embodiment, the electrodes 110, 112 and optional electrodes 144-147 have a width that is less than or equal to their thickness, similarly as shown in FIG. 10. The optional electrodes 144-147 can have similar configurations as shown in the top view of FIG. 2, but can be buried in a trench in the substrate, as shown for electrodes 110, 112 in FIG. 10. The increased thickness can allow for narrower electrodes that conserve substrate real estate while still providing a desired low resistance, thereby reducing series resistance while enabling higher linear densities of ejector conduits. Alternatively, the electrodes 110, 112 and optional electrodes 144-147 have a width that is greater than their thickness.

In the embodiment of FIG. 10, the electrodes 110, 112 and electrodes 144-147 can optionally form rails 148 and 149 that are buried. The rails 148 and 149 of FIG. 10 do not provide sidewalls of the passageways 106C, but can guide molten print material through the ejector conduits 106, such as by wicking of the print material by providing surfaces that are wettable along the length of the passageways. The rails extend the entire length, or substantially the entire length, of the passageways, and can include the electrodes 110, 112 and either i) one or more pairs of the optional electrodes 144-147 or ii) a floating metal layer or other non-metal material in place of the optional electrodes. Any of the metals described for use as electrodes or floating metal layers as described herein, can be employed. Any of the non-metal materials (e.g., semiconductors or insulating materials) described herein can also be employed for portions of the rails, including any of the insulating materials described herein for use as sidewall layer 143.

The electrodes 110, 112 and 144-147 are illustrated as being formed on the same substrate layer. However, one of ordinary skill in the art would readily understand that some or all of the electrodes 110, 112 and 144-147 can be formed on different non-conducting layers (e.g., semiconductor or insulating) sub-layers of a multi-layer stack and routed to the surface of passageway 106C through vias formed in the insulating layers so as to provide electrical contact with print material 104 during printing.

The electrodes 110, 112, 144, 145, 146, 147, as well as electrically isolated metals used in portions of rails (e.g., floating metal layers of rail portions 148b, 149b), can comprise any conductive material suitable for providing electrical contact to the print material 104 while withstanding ejector nozzle temperatures during printing. Examples of suitable conductive materials include metals with higher melting temperatures than the print material 104, including refractory metals, aluminum, aluminum alloys (e.g., 1000 series, 2000 series, 3000 series, 4000 series, 5000 series, 6000 series, such as 6061 and 6063, and 7000 series aluminum alloys), magnesium, magnesium alloys, iron, iron alloys (e.g., steel), copper, copper alloys (e.g., zinc), nickel, nickel alloys, titanium, titanium alloys, silver and silver alloys. Suitable alloys of the above named metals can comprise mixtures of any desired metals, such as mixtures of two or more of any of the above named elemental metals, including the elemental refractory metals, such as, for example, mixtures of two or more of aluminum, magnesium, iron, copper, nickel, titanium, tungsten or any of the other elemental refractory metals, palladium, silver, and so forth. The term "refractory metal" or "refractory metals" as used herein is defined to include both the elemental refractory metals and alloys thereof, including, for example, niobium, molybdenum, tantalum, tungsten, rhenium, titanium, vanadium, chromium, zirconium, hafnium, ruthenium, rhodium, osmium, iridium and alloys of any of these metals, such as alloys of two or more of any of the refractory metals listed herein or alloys of one or more of the refractory metals with other metals, such as iron, nickel, copper, silver or others. Suitable refractory metal alloys are known in the art.

Figure 23A:
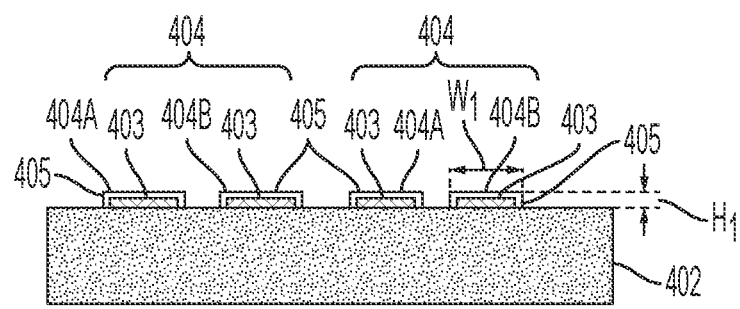
FIG. 23A illustrates a cross-sectional, side view of a partially made array of ejector conduits, according to an embodiment of the present disclosure.

The electrodes and any electrically isolated conductive rail portions 148b, 149b can be corrosion resistant. For example, the electrodes and/or portions 148b, 149b are optionally coated with a passivation layer comprising a noble metal, such as palladium, that resists corrosion by the molten print material. In an example, any of the electrodes taught herein and/or other portions 148b, 149b can comprise tungsten (e.g., elementary tungsten or tungsten alloys), other refractory metals, copper or any of the other metals taught herein as being suitable for electrodes and are coated with a passivation layer comprising a noble metal, such as palladium. An example of a passivation layer 405 is illustrated in FIG. 23A. Employing noble metals as corrosion resistant coatings on electrodes is generally well known.

Figure 12:
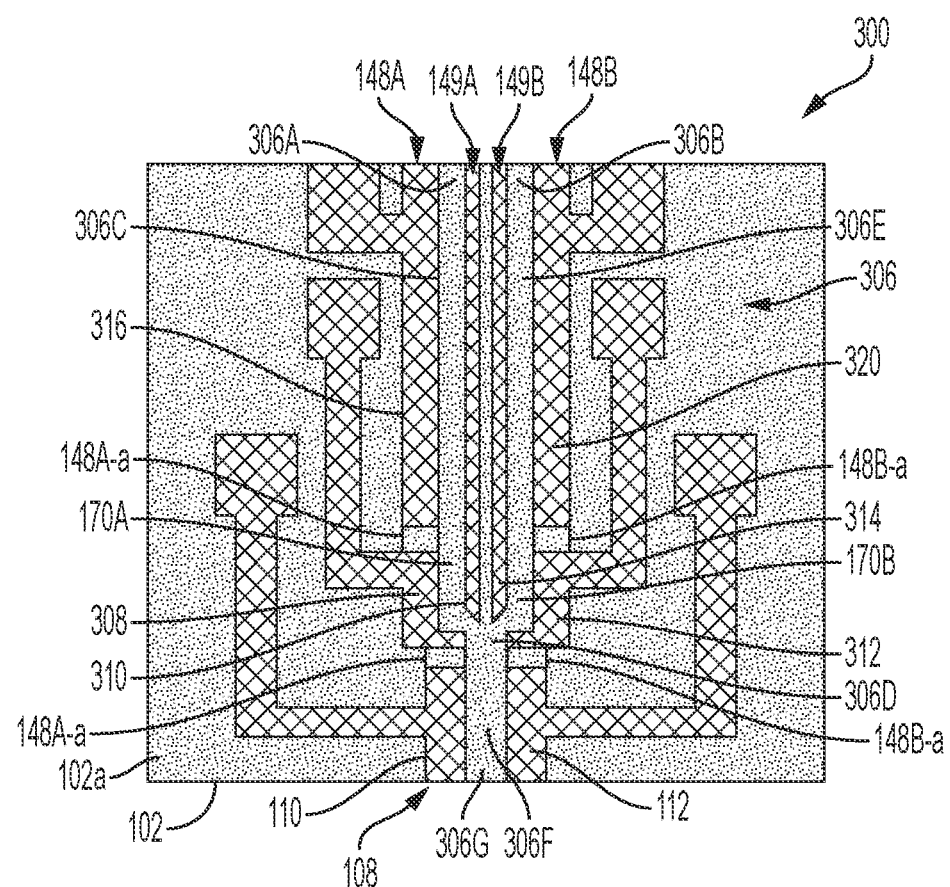
FIG. 12 illustrates a schematic top view of an ejector conduit for mixing print materials, according to an embodiment of the present disclosure.

In an embodiment, ejector devices for mixing two or more different print materials during 3D printing are contemplated. FIG. 12 illustrates an example of an ejector device 300 configured for mixing and ejecting print material 104. A plurality of the ejector devices 300 can be arranged in an array on substrate 102 as described for other ejector devices herein. The ejector device 300 comprises a substrate 102 comprising a semiconductor or electrically insulating surface 102a and an ejector conduit 306 that includes multiple passageways 306C, 306E and 306F. First passageway 306C fluidly connects a first end 306A of the ejector conduit to a conduit junction 306D. The first end 306A is configured to accept a first print material 104A (e.g., FIG. 14). Second passageway 306E fluidly connects a second end 306B of the ejector conduit 306 to the conduit junction 306D. The second end 306B is configured to accept a second print material 104B. A third passageway 306F fluidly connects the conduit junction 306D to a third end 306G comprising an ejector nozzle 108. The ejector nozzle 108 comprises a first electrode 110 and a second electrode 112. At least one surface of the first electrode 110 and at least one surface of the second electrode 112 are exposed in the third passageway 306F.

Referring to FIG. 12, the ejector conduit 306 comprises a third electrode 308 and a fourth electrode 310. At least one surface of the third electrode 308 and at least one surface of the fourth electrode 310 are exposed in the first passageway 306C. The third electrode 308 and the fourth electrode 310 together are a second electrode pair configured to control the flow of the first print material 104A from the first passageway 306C to the third passageway 306F. Ejector conduit 306 further comprises a fifth electrode 312 and a sixth electrode 314. At least one surface of the fifth electrode 312 and at least one surface of the sixth electrode 314 are exposed in the second passageway 306E. The fifth electrode 312 and the sixth electrode 314 together are a third electrode pair configured to control the flow of the second print material 104B from the second passageway 306E to the third passageway 306F. The magnetic flux region extends to a first reload region 170A between the exposed third electrode 308 and the exposed fourth electrode 310 in the first passageway 306C and to a second reload region 170B between the exposed fifth electrode 312 and the exposed sixth electrode 314 in the second passageway 306E. In this configuration, electromagnetic forces, such as Lorentz forces, can be generated by flowing current pulses through the print material between the electrode pairs, as described herein.

In an embodiment, the ejector conduit 306 can comprise a fourth electrode pair comprising electrodes 316, 310 positioned between the second electrode pair 308, 310 and the first end 306A of the first passageway 306C. The fourth electrode pair is configured to control the flow of a portion of the first print material 104A upstream of the second electrode pair 308, 310. The ejector conduit 306 can also comprise a fifth electrode pair comprising electrodes 320, 314 positioned between the third electrode pair 312, 314 and the second end 306B of the second passageway 306E. The fifth electrode pair is configured to control the flow of a portion of the second print material 104B upstream of the third electrode pair 312, 314. The magnetic flux region extends to the region between the fourth electrode pair and the region between the fifth electrode pair, thereby allowing for generation of Lorentz forces to control the print material flow.

In an embodiment, the second electrode pair and the fourth electrode pair share a common electrode 310; and the third electrode pair and the fifth electrode pair share a common electrode 314. In an embodiment, the shared electrodes are held at ground using a buried electrode (not shown). Alternatively, one of ordinary skill would readily be able to determine electrode configurations in which the fourth electrode pair does not employ a common electrode with the second electrode pair, and the fifth electrode pair does not employ a common electrode with the third electrode pair.

The electrode pairs can be configured to form rails that form sidewalls of the passageways 106C and/or that can be used to guide molten print material through the ejector conduits 106, such as by wicking of the print material by providing surfaces that are wettable along the length of the passageways. The rails extend the entire length, or substantially the entire length, of the passageways. In an embodiment, a first rail 148A and second rail 149A for first and third passageways 306C, 306F comprises the first electrode pair (110, 112) and optionally one or both of the second electrode pair (308, 310) and fourth electrode pair (316, 310); and a first rail 148B and second rail 149B for second and third passageways 306E, 306F comprises the first electrode pair (110, 112) and optionally one or both of the third electrode pair (312, 314) and fifth electrode pair (320, 314). Portions of the rails 148 and 149 can comprise an insulating material. For example, insulative rail portions 148A-a and 148B-a can be positioned between the electrodes and comprise an insulating material for electrically insulating the electrodes from other electrodes in the rail, as illustrated in FIG. 12. Additionally, any portion or all of the electrodes 308, 310, 312, 314, 316 and 360 that make up the rails 148A, 149A, 148B and 149B can comprise an insulating material or a floating metal layer (e.g. an electrically isolated metal layer that does not form an electrode), similarly as discussed herein with respect to the rails of FIGS. 1 and 2. Any of the insulating materials and conductive materials discussed herein for use as portions of the rails, including any metal and non-metal materials for floating metal layers, electrodes and insulating portions of the rails, can also be employed for the rails in the device of FIG. 12.

Figure 13A:
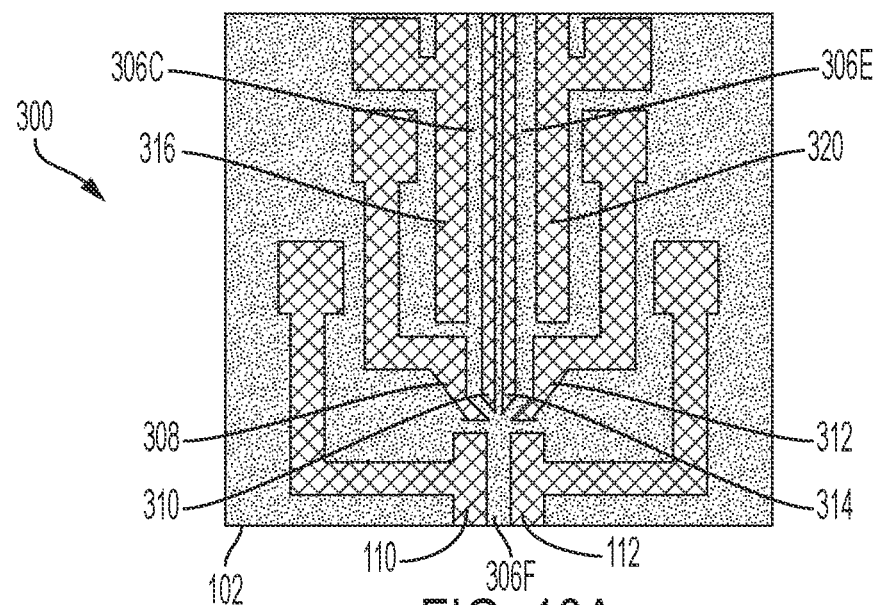
FIG. 13A illustrates a schematic top view of an electrode configuration for an ejector conduit for mixing print materials, according to an embodiment of the present disclosure.
Figure 13B:
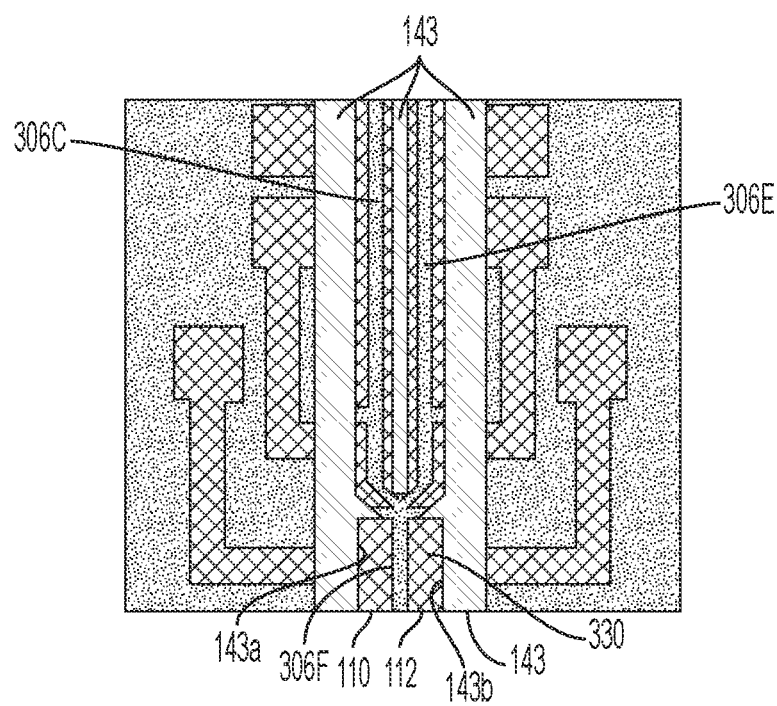
FIG. 13B illustrates a schematic top view of an electrode configuration for an ejector conduit for mixing print materials, according to an embodiment of the present disclosure.
Figure 13C:
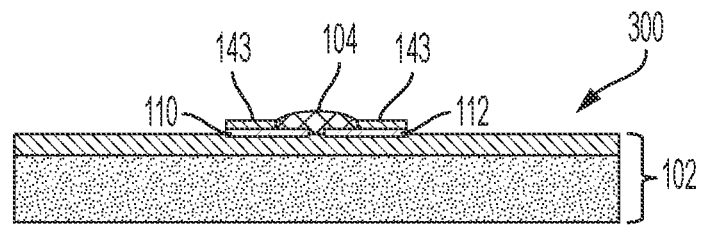
FIG. 13C illustrates a schematic side view of the ejector conduit of FIG. 13B, according to an embodiment of the present disclosure.

FIGS. 13A and 13B show top views of another ejector device 300 for mixing different print materials, according to an embodiment of the present disclosure. The ejector device 300 comprises a substrate 102, such as any of the substrates 102 described herein. As illustrated in FIG. 13A, the electrode configuration comprises a first electrode pair 110, 112 and optionally second, third, fourth and fifth electrodes pairs, similarly as described above for FIG. 12. As illustrated in the end view of FIG. 13C, the electrodes can be formed to have a width that is larger than their height, although any desired width to height ratio can be employed. As shown in FIGS. 13B and 13C, a sidewall layer 143 comprising an insulating material, such as any of the insulating materials described herein, is disposed on the electrodes for bounding the passageways 306C, 306E and 306F, similar to the electrode and sidewall configuration in the device of FIG. 9. Ejector devices 300 comprising multiple passageways for mixing print materials, such as in FIGS. 12 and 13, can also be made using any of the other electrode and sidewall configurations discussed herein, such as the configurations generally illustrated in FIGS. 3 and 10.

Figure 14:
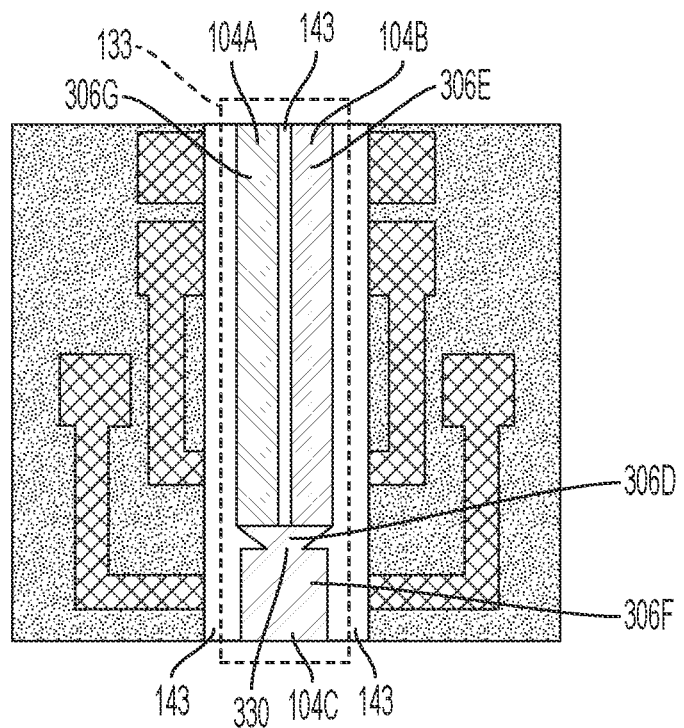
FIG. 14 illustrates a schematic top view of an ejector conduit for mixing print materials, according to an embodiment of the present disclosure.

The ejector devices of FIGS. 12 and 13 exemplify a means for alloy composition control. Referring to FIG. 14, two or more sources of different print materials (e.g., print materials 104A, 104B) are aligned with, and feed print material to, converging channels (e.g., first passageway 306C and second passageway 306E). During operation, the ejector device 300 is held at a temperature where all of the print material components are molten. For example, Al and Mg are both liquids above ~670° C., as are various alloys of Al. Any other combinations of print materials that are molten at a suitable operating temperature can be employed. While only two passageways 306C, 306E are illustrated, the ejector conduits can include three, four or more passageways. The print materials from each of the two or more passageways converge into a third passageway 306F and mix together to form a mixed print material 104C.

Figure 15:
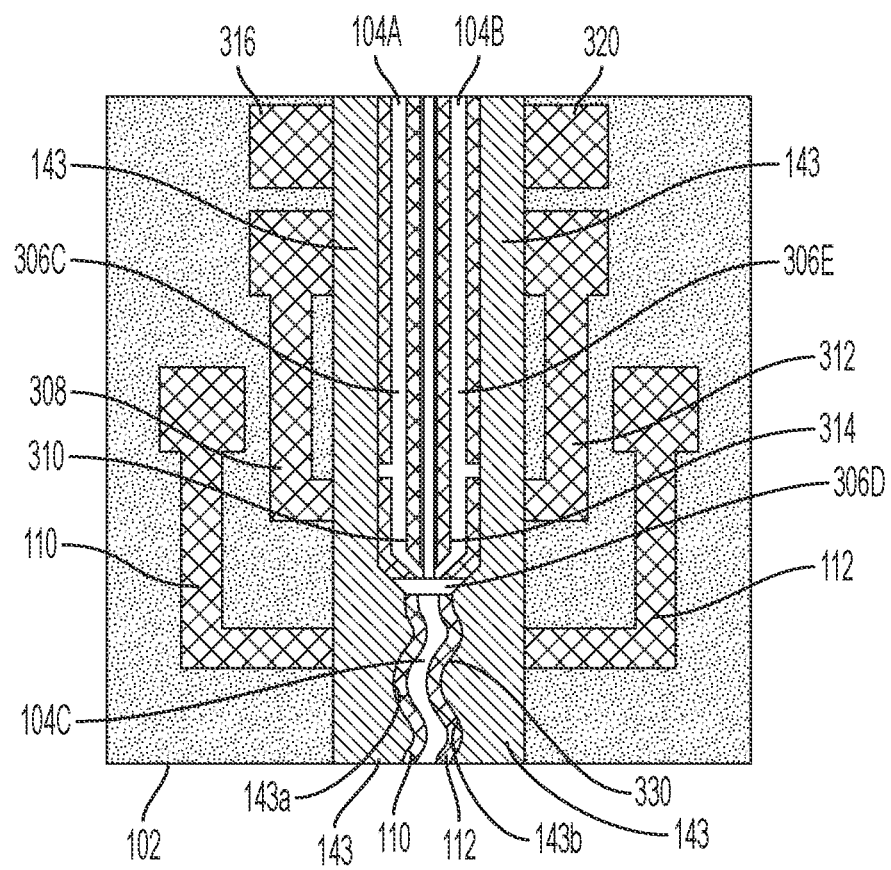
FIG. 15 illustrates a schematic top view of an ejector conduit for mixing print materials, according to an embodiment of the present disclosure.

Third passageway 306F can comprise a linear mixing region 330, as illustrated in FIGS. 13B and 14, which show the proximate surfaces (e.g., opposing, adjacent sidewalls) of electrodes 110, 112 and/or the sidewalls 143a and 143b of the sidewall layer 143 in the ejector nozzle 108 provide a generally linear passageway 306F. Alternatively, third passageway 306F can comprise a non-linear mixing region 330, in which the proximate surfaces (e.g., opposing, adjacent sidewalls) of electrodes 110, 112 and/or the sidewalls 143a and 143b of the sidewall layer 143 in the ejector nozzle 108 provide a generally non-linear, or curved, passageway 306F. For example, the mixing region 330 of the passageway 306F can comprise a serpentine configuration, as shown in FIG. 15. The mixing regions 330 are positioned upstream of, or as part of, the ejector nozzle 108. By controlling the flow of the print materials 104A, 104B to the mixing region 330 (e.g., by using pulse length and/or amplitude control of current pulses to the optional second and third electrode pairs and/or the optional fourth and fifth electrode pairs), the ratio of print materials 104A and 104B in the resulting mixed print material 104C can be altered as desired for each drop to be ejected, as will be discussed in greater detail below.

Figure 11:
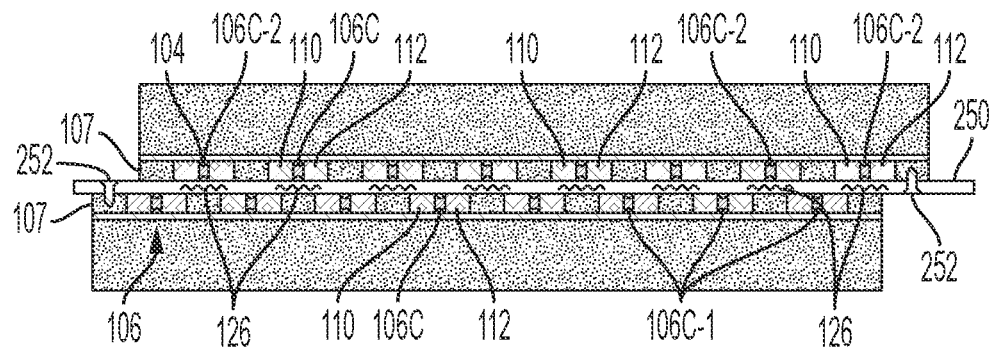
FIG. 11 illustrates an array of ejector conduits comprising a closed channel configuration, according to an embodiment of the present disclosure.

The ejector conduits 106, 306 as described herein above can function as open channels having at least one side that is open to the atmosphere along the length of the passageway. In alternative embodiments, any of the ejector conduits described herein can comprise closed channels that are enclosed on all sides along the length of the passageway(s) (e.g., passageways 106C of FIG. 2 or 306C, 306E and 306F of FIG. 12), while remaining open at the first end 106A and second end 106B to allow for receiving and ejecting print material 104. One such closed channel array is illustrated in FIG. 11, which shows two open channel arrays, as illustrated in FIG. 3, that have been attached so that the passageways 106C of each array 107 are facing the other array 107 to thereby form closed channels. An optional interposer layer 250 is sandwiched between the two arrays 107. Interposer layer 250 can comprise any suitable insulating material that can withstand operating temperatures of the device, such as silicon oxide (e.g., silicon dioxide) or ceramic. In similar fashion as described for the device of FIG. 11, any of the open channel ejector devices described herein can be employed to form ejector devices comprising closed channels.

In yet another embodiment, a closed channel device can be formed by capping any of the open channel array structures herein with a plate comprising, for example, a ceramic, glass or other insulating material. For example, a single array 107 can be capped with the interposer layer 250 as shown in FIG. 11, but without attaching a second array 107.

Further, while the closed channel device is described as an array, a closed channel device comprising a single ejector conduit can also be made by forming, and then capping with a plate, similarly as described above, a single open channel ejector conduit on a substrate. Similarly, two separate ejector devices, each comprising a single open channel ejector conduit on a substrate, can be attached so that the passageways 106C of each ejector conduit are facing the other to thereby form two closed channels. An optional interposer layer 250 can be sandwiched between the two ejector channels, similarly as described above for the device of FIG. 11.

The current pulse generating system 114, which is also referred to herein as a current pulse generating circuit, has the capacity to generate a pulse of current with sufficient amplitude to provide the desired electromagnetic force (e.g., Lorentz force) induced momentum of the print material 104 in a relatively short period of time (e.g., a single current pulse). The current pulse creates sufficient momentum of the print material, arising from the generated electromagnetic force, to cause detachment and ejection of the print material 104 from the ejector nozzle 108 during operation of, for example, a 3D printer. Any type of current pulse generating circuit that can provide a desired pulse of sufficient amperage to eject the print material can be employed. Suitable current pulse generating circuits are well known in the art and any desired current pulse generating system can be employed. The current pulse generating system is in electrical connection with one or more of any of the electrode pairs (e.g., all of the electrode pairs) in the ejector devices described herein, such as the first electrode 110 and second electrode 112 of the ejector nozzle, as shown, for example, in FIGS. 4A, 16A and 16B. In an embodiment, the current pulse generating system 114 comprises a current source in electrical connection with the ejector nozzle 108 (e.g., the current source connected to the first electrode 110 and a current sink in electrical connection with the second electrode 112 of the ejector nozzle). In another embodiment, the current pulse generating system 114 comprises a voltage source in electrical connection with the ejector nozzle 108 (e.g., so as to apply a desired voltage between the first electrode 110 and the second electrode 112 of the nozzle). Examples of suitable current sources and voltage sources are well known in the art.

Referring to FIG. 4A, a circuit of the current pulse generating system 114 can comprise a power supply 114a and a switch 114b operated by a pulse control device 114c, such as a pulse generator, waveform generator or other device capable of generating the desired current pulses. While they are shown separately, the switch 114b may optionally be part of the pulse control device 114c. The pulse control device 114c can be programmable so as to provide for computer control of the current pulse generating system. The power supply 114a can be any power supply, such as a DC power supply or switching power supply, able to supply the desired current. The switch 114b can be any switch capable of providing the desired current pulse in conjunction with the pulse control device 114c. Examples include high current capable switches, including FETs or MEMS switches. Other circuit components can optionally be included, such as amplifiers, resistors and so forth, as would be understood by one of ordinary skill in the art. The current pulse generating system 114 can be electrically connected to the print material in ejector nozzle 108 using electrodes 110 and 112, as described herein.

FIG. 16A illustrates an example of a current pulse generating circuit that can potentially be employed to provide a relatively high current pulse over a small duration of time at a low duty cycle. The current pulse generating system 114 of FIG. 16A employs a power supply 114a, which is a DC power supply, such as a switching power supply, and a plurality of FETS (e.g., GaAs FETS or other FETS) that act as switches 114b, to charge one or more capacitors. The current pulse generating system 114 of FIG. 16A is electrically connected to the print material in ejector nozzle 108 using electrodes 110 and 112, as described herein. The charged capacitor(s) can be discharged to provide the desired current pulse 118 across the print material. General circuit designs can employ DC voltage supplies, high power operational amplifiers with a current feedback resistor, and/ or fast, low series-impedance switches, such as GaAs nMOS transistors. Such circuits are generally well known. Rapid bipolar switching can be similarly applied using, for example, high current H-bridges. Any other suitable current pulse generating circuit capable of providing suitable current pulses can be employed.

In an embodiment, the current pulse generating system 114 comprises a pulse control device that is programable. Pulse control system 160 (FIG. 16A) is an example of a programmable pulse control device that comprises a pulse controller 162 and a computation system 164. The pulse controller 162 can be, for example, a microcontroller comprising a CPU 167 and memory 172 that interfaces with the circuit components (e.g., a current switch, power supply and/or other components) of the current pulse generating system 114 to generate current pulses having the desired pulse characteristics when the current pulse is flowed between the first electrode 110 and second electrode 112. The pulse controller 162 can be driven by the computational system 164, which is capable of carrying out computer executable instructions embedded in a non-transitory computer readable medium (e.g., the memory 166 of the computation system 164). The computation system 164 can be integrated as part of the pulse controller 162 itself (e.g., can employ a CPU and memory integrated into the pulse controller 162, such as CPU 167 and memory 172) or can be a separate computer system (as shown in FIG. 16A), including, for example, a memory 166 and CPU 168, that interfaces with the pulse controller 162. The computer executable instructions embedded in the non-transitory computer readable medium of the computation system 164 can, among other things, instruct the CPU 168 of the computation system 164 to determine at least one desired pulse characteristic such as pulse length, amplitude and/or pulse shape for ejecting the print material 104 as described herein. The computation system 164 can determine the at least one desired pulse characteristics in any suitable manner, such as by using mathematical algorithms to calculate the pulse characteristics that will provide the desired ejection characteristics of the print material 104, and may, for example, take into account such things as the type of print material, pulse history of the ejector and/or feedback from the printer jetting mechanism. Such feedback can include, for example, real time magnetic flux variations, nozzle temperature, print material temperature and/or other data. Additional computer executable instructions embedded in the non-transitory computer readable medium (e.g., memory 166 or 172) of one or both of the computation system 164 and pulse controller 162, are executed by a CPU of the pulse control system 160 (e.g., CPU 168 and/or CPU 167) to send instructions or electrical signals for causing the voltage source or current source of the current pulse generating system to flow an electrical current between the first electrode 110 and the second electrode 112. The resulting electrical current comprises a current pulse 118 having the at least one pulse characteristic. By controlling the current pulses across the first electrode 110 and second electrode 112, the ejection of the print material 104 can be controlled, including such things as droplet volume, velocity of the ejected print material and ejection rate (e.g., number of ejections per second). Optionally, controlling the current pulses across one or more of the second, third, fourth and fifth electrode pairs in the ejector devices of the present disclosure can be used to control the flow of print material in the ejector conduits, as described in greater detail herein.

As described above, when determining the desired pulse characteristics, the computation system 164 can optionally compensate for such things as the effect on conductivity, thermal expansion, magnetic flux or other temperature dependent properties of the print material 104 or the system (e.g., effect of temperature on the magnet or flux guide) due to, for instance, the temperature changes at the nozzle 108 caused by changes in duty cycle. For example, in some cases, duty cycle may be high, one pulse quickly following another. This can potentially cause the ejector nozzles 108, the ejector conduits 106 proximate the ejector nozzle and/or the print material 104 contained therein to locally rise in temperature compared to a lower duty cycle situation. Such temperature changes can have effects on print material ejection. By accounting for these effects when determining pulse characteristics, the computation system 164 of the current pulse generating system can control and/or improve the ejection characteristics of the printer jetting mechanism 100.

FIG. 16B illustrates a current pulse generating circuit similar to that of FIG. 16A, except that the current pulse generating circuit of FIG. 16B can be employed with an ejector nozzle 108 comprising more than one pair of electrodes 110a, 112a; 110b, 112b and 110c, 112c. While three pairs of electrodes are shown, any number of electrode pairs can be employed, such as 1 to 10 electrode pairs, or 2 to 5 electrode pairs. Such a design may potentially allow for improved control and/or higher current density through the print material as compared with the single electrode pair design of FIG. 16A. For example, multiple electrodes per nozzle can enable variable volume droplet ejection, where the droplet volume for each ejection can be varied by sending current pulses to a desired number of electrode pairs. Thus, a smaller droplet can be ejected by pulsing current through a single electrode pair 110a, 112a; while larger droplets can be ejected by pulsing current through two electrode pairs 110a, 112a and 110b, 112b, or 3 or more electrode pairs. A pulse control system 160, such as that illustrated in FIG. 16A, can also be employed for controlling the current pulse generating circuit of FIG. 16B. Any of the devices of the present disclosure can employ multiple electrode pairs in the ejector nozzle(s) 108, as described herein.

The feeder mechanism 113 can be any suitable mechanical system, pressure driven system or other system capable of feeding print material 104 to the ejector conduits 106. The feeder mechanisms can comprise one or more pumps, actuators or combination thereof that can function as a mover 113a (FIG. 22) for moving the print material 104. Examples of suitable actuators include electric motors, piezo electric motors, inchworm actuators, hydraulic actuators, and pneumatic actuators, which are generally well known.

An electromagnetic force drive (e.g., a Lorentz force drive) can also be employed as a suitable actuator for controlling flow of print material 104 upstream of the plurality of ejector conduits 106 and/or to control flow of print material 104 from the reservoir 140 into the ejector conduits 106. Such an electromagnetic force drive can employ a magnetic field over one or more electrode pairs used to control current through the liquid metal and thereby apply an electromagnetic force to the print material, similarly as described herein for using electromagnetic forces to control flow of print material 104 in the passageway(s) 106c using electrode pairs (e.g., 144, 145; 146, 147 of FIG. 2). For example, portions 148b, 149b of rails 148, 149 of FIG. 1 can optionally be configured to act as such an electrode pair for controlling flow of print material 104 from reservoir 140.

The type of feeder mechanism 113 that is used will depend on the type of print material 104 being employed. In an example, print material 104 comprises a plurality of filaments and the feeder mechanism 113 is a mechanism for advancing the plurality of filaments. The term "filament" or "filaments" for purposes of the present disclosure is defined to include both solid filaments (e.g., a wire, such as 104 in FIG. 22) or liquid filaments, such as liquid filled capillaries or other liquid filled conduits. Examples of feeder mechanisms for solid filaments include spool feeders and inch worm actuators, which are well known in the art. Other feeder devices for ratcheting or otherwise advancing solid print material 104 to the ejector conduits 106 in the form of solid filaments, dry powders or other solid forms can also be employed as the feeder mechanism 113 or a portion of the feeder mechanism, as would be understood by one of ordinary skill in the art.

In embodiments, the feeder mechanism 113 can be any suitable mechanism for supplying a liquid print material into the ejector conduits 106 and optionally advancing the liquid print material to the ejector nozzles 108. Examples of suitable feeder mechanisms for liquid print materials include mechanisms employing capillary forces and/or overpressures sufficient to advance the liquid from a reservoir or other source of print material (e.g., molten metal) and thereby stably refill the ejector nozzles 108 after ejection occurs (e.g., the feeder mechanism can be designed to automatically refill the ejector nozzles after an ejection occurs). The feeder mechanisms can comprise, for example, a pump, or a feeder conduit and/or reservoir configuration that can be filled with print material to provide a hydrostatic pressure head (e.g., by maintaining a certain fill level of print material in the reservoir) or other device or combination of such devices for applying overpressure. Such feeder mechanisms are well known in the art. One of ordinary skill in the art would be able to readily determine an appropriate feeder mechanism.

If rails 148, 149 coated with metal are employed as described herein, the capillary forces provided thereby can potentially supply the desired flow of print material through the passageways to the ejector nozzles without the aid of overpressure from an additional feeder mechanism. Further, electromagnetic forces provided by additional electrode pairs, as described herein, can be employed in place of hydrostatic pressure or capillary forces to drive, or impede, the flow of print material in the passageways of the ejector conduits.

In an embodiment, the feeder mechanism 113 can supply the print material to each ejector conduit 106 at a different feed rate. As an example, a feeder mechanism 113 for advancing the plurality of filaments comprises a separate mechanism for incrementally advancing each of the plurality of filaments at a separately controllable feed rate. Thus, in an embodiment, as the ejection rate at each ejector is increased or decreased as desired for printing, the feed rate is able to satisfy replenishment of print material 104 to the ejector nozzles before the next ejection.

Figure 8:
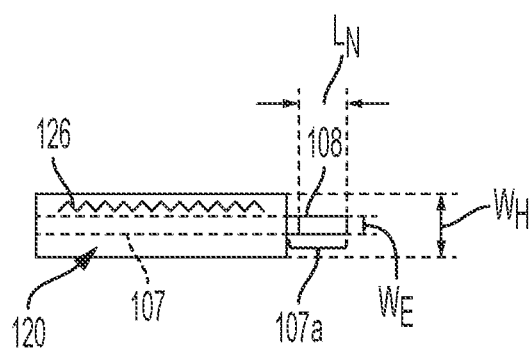
FIG. 8 illustrates a schematic, side view of the ejector conduit array employed in the printer jetting mechanism of FIG. 7, according to an embodiment of the present disclosure.

Referring to FIGS. 7 and 8, arrays 107 of any of the ejector devices described herein can be supported within an ejector housing 120. In an embodiment, the ejector devices can be separate structures from the housing material and can be mounted in any suitable fashion to the ejector housing 120. The ejector housing 120 comprises any suitable materials that can withstand jetting process temperatures and that can provide the desired support for the ejector conduits 106. Examples of suitable housing materials include materials chosen from metals, such as aluminum, copper, brass and steel, refractory metals, ceramics, other refractory materials, polymers that are capable of withstanding process temperatures (e.g., polymers with melting points of 150° C. to 650° C. or higher, such as 200° C. to 300° C.) and combinations thereof, such as metal coated ceramics and ceramic coated metals. An example of a composite housing material is copper clad with a ceramic, such as mullite, where the copper and mullite have similar thermal expansion coefficients. The specific material employed can depend on the print material to be jetted. For purposes of the present disclosure, the terms "refractory material" and "refractory materials" are broadly defined as any materials that have a melting point of 1000° C. or more at 1 atmosphere pressure. For example, the refractory material can have a melting point ranging from 1000° C. to about 4000° C., such as about 1200° C. to about 4000° C., or about 1400° C. to about 3500° C., or about 1700° C. to about 3500° C., or about 2000° C. to about 3500° C.

In an embodiment, the printer jetting mechanism 100 comprises a heater mechanism 126 for heating at least a portion of the ejector conduits 106 and optionally the ejector housing 120 surrounding the ejector conduits 106 during operation of the three-dimensional printer, as shown for example in FIGS. 1, 5, 8, 10 and 11. In the embodiment, the heater mechanism 126 is capable of maintaining the temperature of a reservoir 140 and the passageways 106C of ejector conduits 106 at or above the melt temperature of the print material 104. The reservoir 140 is in fluid connection with the plurality of ejector conduits 106. In an example, heater mechanism 126 can provide sufficient thermal energy so as to bring the print material 104 to a temperature that is at or above melting temperature of the print material 104 and maintain the print material 104 at or above the melt temperature while it is held in reservoir 140 and flowed from the reservoir 140 through ejector conduits 106 to nozzles 108.

Heater mechanism 126 can comprise, for example, any suitable type of resistive heater, inductive heater, radiant heater or combination of any of these. For instance, heater mechanism 126 comprises heating elements that are positioned proximate the reservoir 140 or conduits 106. The heating elements can be in the form of resistive heating coils or induction coils, as examples. As an example, a suitable resistive heater mechanism comprises an ohmic meander trace embedded in the substrate, housing or layers (e.g., sidewall layers 143 or any other insulating layers) surrounding the passageway 106C and/or the print material reservoir 140. The term "ohmic meander trace," as used herein, refers to a resistive heating element that has a non-linear path along a longitudinal axis (e.g., a wire suitable for resistive heating having a zigzagging, winding or otherwise curved path). The heater mechanism 126 is separate from the current pulse generating system 114 and/or electrodes 110, 112 and electrodes 144-147.

In an embodiment, the array of ejector conduits 106 includes M columns of ejector conduits arranged on an X axis and N rows of ejector conduits arranged on a Y axis, where M is an integer ranging, for example, from about 2 to about 1000 and N is an integer ranging from 1 to 2. For example, M is 3 and N is 1 for the array of FIG. 2, while M is 8 and N is 2 for the array of FIG. 11. In other examples, M is an integer ranging from about 5 to 1000, 50 to 1000, 100 to 900, 250 to 750 or 500 to 1000.

In an embodiment, the rows of the ejector conduits 106 are arranged linearly and the ejector conduits 106 in each row are staggered with respect to the ejector conduits of adjacent rows to facilitate closer packing, as shown, for example, in FIG. 11. Multiple arrays can be stacked or otherwise combined to extend the number of rows or columns in a system, as desired.

The ejector device design and MEMS manufacturing technology that can be employed to make the ejector devices of the present disclosure allow for increased nozzle density compared to most non-MEM manufacturing technologies. For example, nozzle densities for a single row array of ejector conduits, such as shown in FIG. 2, for example, can be greater than about 5 nozzles per inch, such as from about 10 nozzles per inch to about 1500 nozzles per inch, or about 50 nozzles per inch to about 1000 nozzles per inch, or about 100 nozzles per inch to about 500 nozzles per inch. The number of nozzles per inch could effectively be doubled for a double row array of ejector conduits, such as shown in FIG. 11. The actual nozzle density will depend on a number of factors, including the desired nozzle size and the complexity of the ejector conduits in the array, among other things. While lower nozzle densities can be employed if desired, the relatively large nozzle densities provided by this technology can allow for shorter 3D print times and/or smaller drop sizes than if arrays with smaller nozzle densities were employed.

Figure 17:
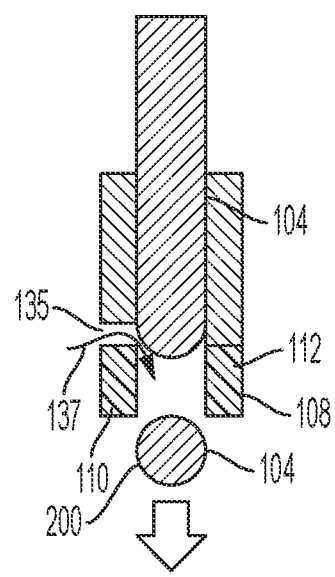
FIG. 17 illustrates a schematic, cross-sectional side view of an ejector nozzle having a closed channel configuration comprising a vent, according to an embodiment of the present disclosure.
Figure 18A:
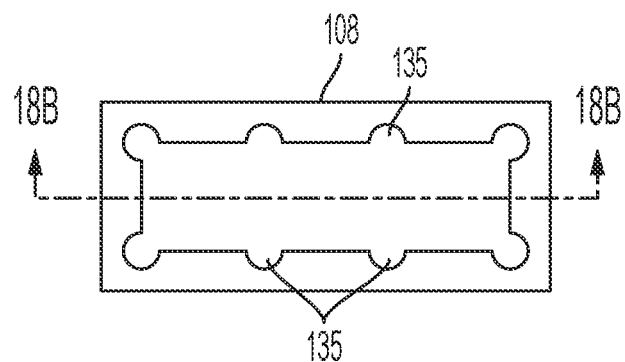
FIG. 18A illustrates a schematic, cross-sectional view of an ejector nozzle comprising a plurality of vents, according to an embodiment of the present disclosure.
Figure 18B:
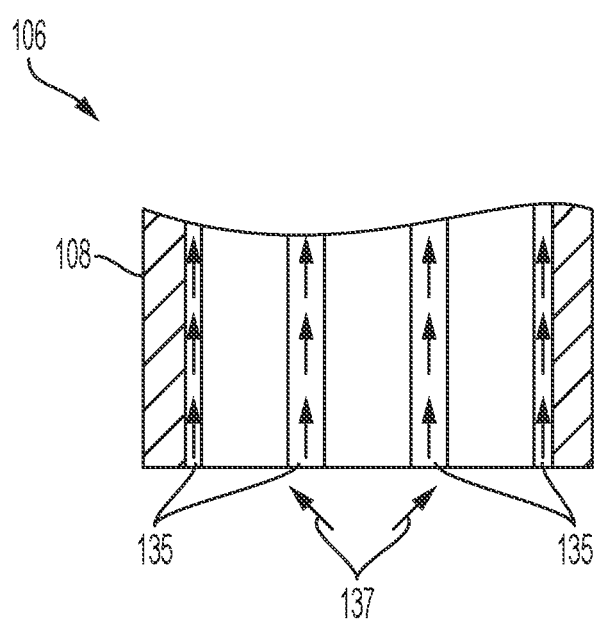
FIG. 18B illustrates a schematic, cross-sectional view of the ejector nozzle of FIG. 18A, according to an embodiment of the present disclosure.

Droplet formation during ejection of the print material can occur by any suitable mechanism within or outside of the ejector nozzles 108. In an embodiment, detachment of the print material to form droplets can occur by necking off of the print material inside of the ejector conduits 106, such as within nozzles 108. In embodiments in which closed ejector conduits, such as shown in FIG. 11, are employed, the ejector conduits 106 can optionally include one or more vents 135, such as illustrated in FIG. 17. Vents 135 can be positioned in or just above ejector nozzles 108, such as at or near the position in the ejector nozzle 108 where necking off of the print material 104 being ejected from the remaining print material 104 in ejector conduit 106 is to occur during droplet formation. The vents 135 allow air or other ambient gas (as illustrated by arrow 137) to flow into the ejector conduits 106 and/or into the ejector nozzles 108 as the print material 104 is ejected therefrom. This can allow the print material 104 being ejected to more easily be separated from the remaining print material 104 in ejector conduit 106 and/or more easily be ejected from the ejector nozzles 108. The one or more vents 135 can be configured in any manner that will allow ambient gas to flow into the ejector nozzle as the print material 104 is ejected. FIGS. 18A and 18B illustrate another example in which the vents 135 take the form of grooves on the inner surface of the ejector nozzles 108. Any other suitable vent configurations could be employed. In an embodiment, the vents 135, such as in FIGS. 17, 18A and 18B have dimensions that are sufficiently small so that the surface tension of liquid print material 104 would not allow substantial amounts of the print material to flow out of the ejector conduits into the vents 135, while being sufficiently large to allow ambient gas to flow through the grooves and into the ejector nozzle 108. For example, the width and/or length of the vent 130 of FIG. 17 or diameters, in the case of circular shaped vents (not shown), or groove widths of FIG. 18 can be ten or more times smaller than the inner diameter of the ejector nozzle so that penetration of the liquid print material is reduced or eliminated. The vents can be formed by any suitable means, such as by etching techniques or laser ablation that are well known in the art.

The present disclosure is not intended to be limited to any specific droplet formation and/or detaching modes. For example, while the droplets can neck off and detach at a detachment zone inside the ejector conduits 106, it is also possible that the droplets can neck off and detach outside the ejector conduits 106, followed by retraction of undetached print material 104 back into the ejector conduit 106. Thus, a mode of jetting of droplets can include electromagnetic force driven "extrusion" of the molten print material 104 out from the ejector nozzle 108 into free space followed by a deacceleration/retraction of the extruded print material 104 as the current pulse is terminated and the print material 104 contracts. Other modes of jetting and/or detaching droplets can also be realized.

Figure 19:
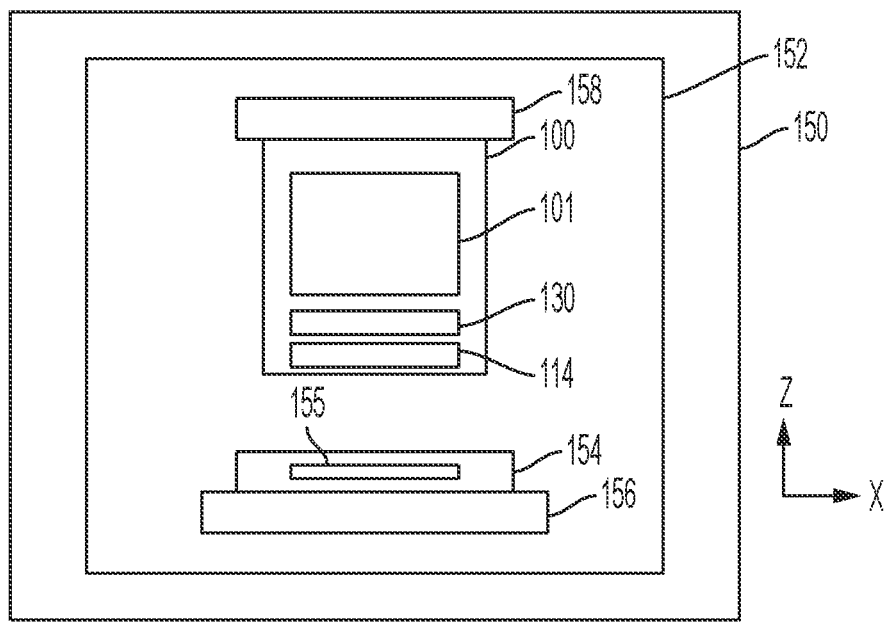
FIG. 19 is a block diagram of a 3D printer, according to an embodiment of the present disclosure.

The printer jetting mechanisms 100 described herein can be employed in any type of printer that is suitable for jetting of a print material. The printer jetting mechanisms 100 can be separately manufactured and sold for use in a printer, or alternatively manufactured together as part of a printer, or as part of a larger printer component. In an embodiment, the printer is a three-dimensional ("3D") printer usable for printing 3D objects. A block diagram of an example 3D printer 150 is shown in FIG. 19. The 3D printer 150 can comprise any of the printer jetting mechanisms 100 described herein. In an embodiment, the printer jetting mechanism 100 can comprise an ejector device 101 comprising an array of ejector conduits, or any of the other ejector devices described herein, as well as a current pulse generating system 114 and a magnetic field source 130. Additionally, the 3D printer can comprise a positioning system 152 for controlling the relative position of the ejector device 101 with respect to a print substrate 154. The phrase "controlling the relative position of the ejector device with respect to the print substrate" means that either one or both of the ejector device and the print substrate 154 can be moved in order to alter the relative position of the ejector device with the print substrate. While the ejector device is described herein as being moved relative to the print substrate, it is also to be understood that all or portions of: i) the current pulse generating system and ii) the magnetic field source, can also be moved relative to the print substrate using the positioning system 152. The relative position of the ejector device with the print substrate 154 is modified during printing so that the print substrate 154 is positioned to receive print material 104 jettable from the plurality of ejector conduits and thereby form a 3D object. The positioning system 152 can comprise one or both of a print substrate handling mechanism 156 for positioning the print substrate 154 and an array positioning mechanism 158 for positioning the ejector device and optionally other parts of the printer jetting mechanism 100, such as portions of, or electrical connections to, the current pulse generating system 114. The print substrate 154 can comprise any substrate on which it is desirable to print a three-dimensional object. An example of a print substrate 154 is a build plate that is part of the 3D printer 150, or other temporary substrate from which the 3D object may be removed after printing. In another example, the print substrate 154 may be intended to be permanently attached to the three-dimensional object after printing, such as, for example, if the print substrate 154 is a printed circuit board on which a portion of a circuit is being printed.

Figure 22:
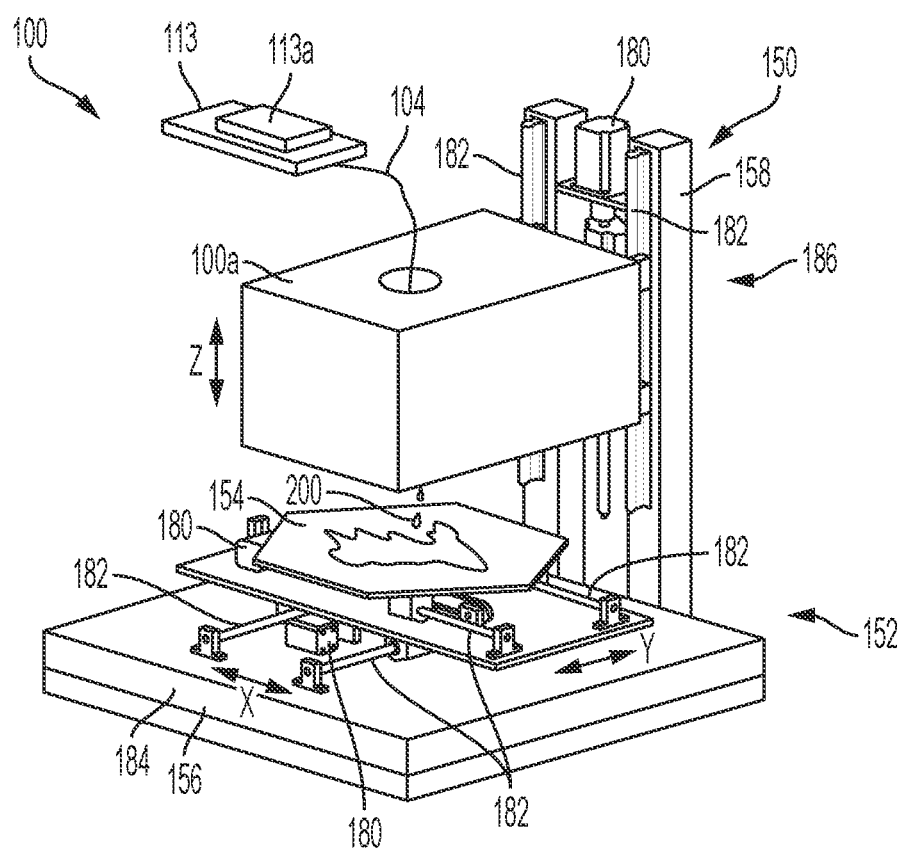
FIG. 22 is a schematic, perspective view of a 3D printer, according to an embodiment of the present disclosure.

The print substrate handling mechanism 156 can be any mechanism suitable for positioning the print substrate 154 to receive print material jettable from the ejector device during operation of the 3D printer 150. In an embodiment, the print substrate handling mechanism 156 has the ability to position the print substrate 154, such as a build plate or other substrate, by moving the print substrate 154 in a direction along an x-axis, a y-axis and/or a z-axis to a desired position to which the jetted print material is targeted. The array positioning mechanism 158 can be any mechanism suitable for moving the ejector device in a direction along one or more of an x-axis, a y-axis and/or a z-axis to a desired position to which the jetted print material 104 is targeted. The positioning system 152, including either or both of the print substrate handling mechanism 156 and the array positioning mechanism 158, can comprise one or more actuators 180 (FIG. 22) that can function as a mover for positioning the print substrate 154 and ejector device relative to each other using, for example, a system comprising tracks 182. Examples of suitable actuators include electric motors, piezo electric motors, hydraulic actuators, and pneumatic actuators. FIG. 22 illustrates an example of such a positioning system 152, which comprises an actuated (e.g., motorized) X-Y stage 184 for supporting the print substrate 154 and a vertical track system 186 on which all or a portion 100a of printer jetting mechanism 100 can be moved using one or more actuators 180 to allow for vertical positioning. Portion 100a of printer jetting mechanism 100 can comprise any of the components of printer jetting mechanism 100 described herein that are attached to the vertical track system 186 for vertical positioning, including the ejector device, all or part of the current pulse generating system and all or part of the magnetic field source. The feeder mechanism 113 can be positioned so as not to be directly attached to the vertical track system 186 (as illustrated in FIG. 22), or in other embodiments, can be directly attached to the vertical track system 186. In another embodiment, positioning system 152 comprises an actuated (e.g., motorized) X-Y-Z stage for supporting and positioning the print substrate 154 in three dimensions and the position of portion 100a (e.g., the printhead) of printer jetting mechanism 100 is fixed. It is generally easier to fix the printhead with its attached feeders and support elements and just move the print substrate 154 in 3D. However, any means for relative motion can be used.

As mentioned, the positioning system 152 can comprise one or both of the print substrate handling mechanism 156 and the array positioning mechanism 158. As an example, the print substrate handling mechanism 156 can be used to move the print substrate 154 along both the x-axis and y axis, and the array positioning mechanism 158 can be used to move the ejector device and optionally the entire printer jetting mechanism 100 or any portion thereof along the z-axis, thereby allowing the print substrate 154 and ejector device to be positioned relative to each other in three-dimensions during operation of the 3D printer. As an example, for purposes of this discussion, the x-axis and z-axis are as illustrated relative to a printing operation in FIG. 20, with the y-axis (not shown) being in the direction into the paper; the x-axis and y-axis being parallel to the upper surface of the print substrate 154 and the z-axis being perpendicular to the upper surface of the print substrate 154.

In an embodiment, the print substrate 154 is a build plate and optionally employs a heater mechanism 155, such as resistive heating elements, inductive heating coils, radiative heating lamps or lasers or a combination of two or more of these, positioned within, or proximate to, the build plate; or in the case of radiative heating lamps or lasers, positioned so as to allow for impinging of the build plate with radiant energy. The heater mechanism 155 can provide sufficient thermal energy to heat the build plate and/or a 3D object being printed thereon to desired deposition temperatures.

Suitable build plates, including build plates with heater mechanisms, are well known in the art.

An embodiment of the present disclosure is directed to a method for jetting print material from a printer jetting mechanism. As described at 220 of FIG. 21, the method comprises supplying a print material 104 that is electrically conductive to an ejector device comprising a plurality of ejector conduits 106 on a substrate 102 (FIGS. 1 and 2). The ejector conduits 106 comprise first ends 106A configured to accept the print material and second ends 106B comprising ejector nozzles 108. In an embodiment, the ejector nozzles 108 can have an inner width (e.g., diameter) ranging, for example, from about 10 microns to about 1000 microns, or any of the other ejector nozzle widths disclosed herein. In the methods described herein, ejector nozzles 108 comprise electrodes 110, 112 for supplying electrical current in the form of electrical pulses through the print material, as discussed in greater detail herein.

Figure 21:
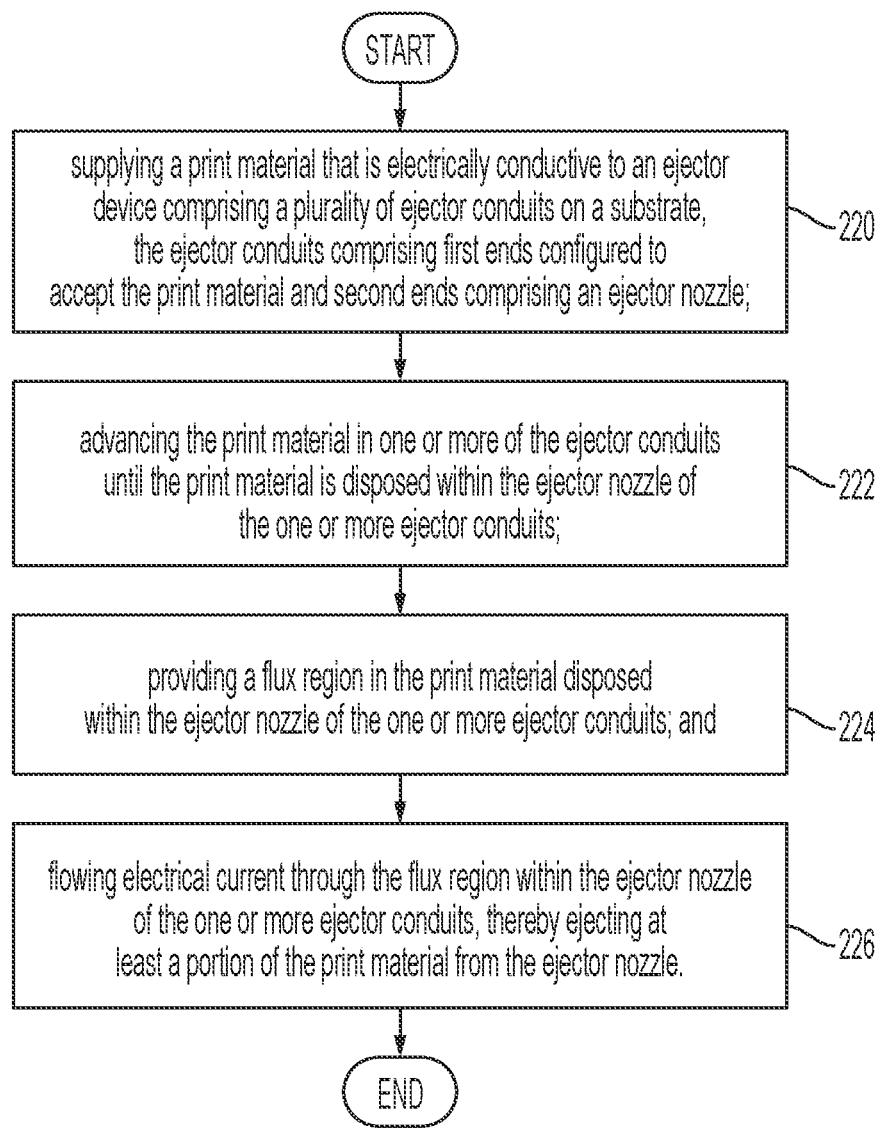
FIG. 21 is a flow diagram of a method for jetting print material from a printer jetting mechanism, according to an embodiment of the present disclosure.

As shown at 222 of FIG. 21, the print material 104 is advanced in one or more (e.g., such as all) of the ejector conduits 106 of the array 107 until the print material 104 is disposed in the ejector nozzles 108. As an example, print material 104 can be advanced to at least partially fill (e.g., completely fill or substantially fill) the ejector nozzles 108.

In an embodiment, print material 104 is supplied as a solid or liquid and then advanced as a liquid phase to the ejector nozzles 108. For example, print material 104 can be supplied in the form of one or more filaments in solid or liquid phase to the reservoir 140 or to the plurality of ejector conduits 106. If the print material 104 is supplied as a solid, the print material is heated to melting using, for example, the heater mechanisms 126 as described herein before being flowed through the ejector conduits to the ejector nozzles. In an example, the melting can occur in the reservoir 140, prior to or just as the print material enters the reservoir 140. Once melting occurs, the liquid, or molten, print material 104 is maintained at or above the melting temperature and advanced by flowing the print material to the ejector nozzles 108.

The desired feed rate of print material can be different for each ejector nozzle 108. The feed rate can depend on the rate at which the print material is being ejected from the ejector nozzle 108, which in turn will depend on the number of ejections per unit time from each nozzle and the droplet size per ejection.

The print material 104 can be any electrically conductive material. In an example, the print material comprises at least one metal. The at least one metal can be chosen from, for example, tin, tin alloys, lead, lead alloys (e.g., solder comprising one or both of tin and lead), aluminum, aluminum alloys (e.g., 1000 series, 2000 series, 3000 series, 4000 series, 5000 series, 6000 series, such as 6061 and 6063, and 7000 series aluminum alloys), magnesium, magnesium alloys, iron, iron alloys (e.g., steel), copper, copper alloys (e.g., zinc), nickel, nickel alloys, titanium, titanium alloys, silver and silver alloys. Suitable alloys of the above named metals can comprise mixtures of any desired metals, such as mixtures of two or more of any of the above named elemental metal print materials (e.g., mixtures of two or more of aluminum, magnesium, iron, copper, nickel, titanium, silver and so forth). In an embodiment, the print material 104 has a metal content of greater than 90% by weight, such as about 95% to 100%, or 98% to 100%, or 99% to 100%, or 99.5% to 100%, or 99.8% to 100% by weight, or 99.9% to 100% by weight.

In an example, the print material 104 has a resistivity of less than $1\times10^{-5}$ ohm*m at 20° C., such as about $1\times10^{-6}$ ohm*m or about $1\times10^{-7}$ ohm*m to about $\times1\times10^{-8}$ ohm*m at 20° C. (e.g., is electrically conductive at room temperature (20° C.)). In an example, the print material 104 has a resistivity of less than $1\times10^{-5}$ ohm-m, such as about $1\times10^{-6}$ ohm*m to about $\times1\times10^{-8}$ ohm-m, while in a solid form, a liquid form, or while in both solid and liquid forms, and while at a temperature of within 300° C. of the melting temperature. The print material can have any desired melting temperature. In examples, the print material has a melting temperature ranging from about 50° C. to about 3000° C., about 100° C. to about 2000° C., about 150° C. to about 1600° C., about 500° C. to about 1200° C., or about 600° C. to about 1000° C.

As shown at 224 of FIG. 21, a magnetic field is provided in the ejector nozzles 108, thereby forming a flux region 133 (e.g., FIG. 4B) in the print material 104 disposed within the ejector nozzles of the one or more ejector conduits. This can be accomplished, for example, by immersing at least a portion of the ejector nozzles 108 in a magnetic field that is supplied by a magnetic field source 130, as described herein. In an embodiment, the ejector nozzles 108 remain continuously immersed in the magnetic field throughout operation of the printer jetting mechanism 100. In another embodiment, the magnetic field is periodically turned on and off as desired, such as by using a switch (not shown) to connect and disconnect the flux guide 134 from the magnet 132, or by employing an electromagnet as magnet 132 in combination with the flux guide 134 and switching the electromagnet on and off. In this case, the magnetic field is controlled so as to be on when the electrical current is pulsed between electrodes 110, 112 to provide the electromagnetic force.

As shown at 226 of FIG. 21, the method comprises flowing electrical current through the flux region 133 within the ejector nozzle 108 of the one or more ejector conduits, thereby ejecting at least a portion of the print material 104 from the ejector nozzle 108 onto, for example, a print substrate 102. The flowing of the electrical current can comprise, for example, employing a current pulse generating system 114, such as any of the current pulse generating systems herein, to send a current pulse between the first electrode 110 and the second electrode 112.

When a current, i, is pulsed through the conductive print material 4 between electrodes 110, 112 in ejector nozzle 108 in a direction that is substantially perpendicular to the direction of the magnetic field, B, a Lorentz force is generated on the conductive print material 104 through which the current flows. Generally speaking, the Lorentz force, and thus the ejection force, or momentum, of the print material being ejected from the ejector nozzles 108, will be proportional to the cross-product of the current, i, and flux density, B, in the flux region.

The amount of the current (e.g., pulse amplitude) and the length of the current pulse used to achieve the desired momentum of the ejected print material will depend on such things as the type of print material, the flux density in the flux region and amount of print material being ejected and can readily be determined by one of ordinary skill in the art. In addition to providing the momentum for ejection, shorter current pulse lengths can also potentially allow for a faster ejection rate (e.g., increased number of ejections of print material per second from the same ejector nozzle).

In an embodiment in which electrodes 110 and 112 are employed to separate a droplet from a remaining print material 104 in the ejector conduit 106, the direction of current between electrodes 110 and 112 can be reversed immediately after the ejection current has been pulsed through the conductive print material 104 to force a portion of liquid print material 104 to be ejected out of ejector nozzle 108. Reversing the direction of current reverses the Lorentz force on the portion of print material 104 remaining in the nozzle 108, thereby pulling a portion of the column of liquid print material back into the print nozzle 108. This may serve to increase the force at the necking off point of the liquid print material where the drop is forming so that the drop will more readily break off from the remaining column of print material. In an alternative embodiment, immediately after flowing the current pulse through the conductive print material 104 to force liquid out of ejector nozzle 108 the flow of electrical current is stopped. In this embodiment, the initial pulse of current is sufficient to provide the desired drop formation and ejection of the print material 104 without reversing the direction of current flow between electrodes 110 and 112.

While achieving the ejection of print material 104 using a single pulse of current is taught above, it may also be useful to use more than one pulse of current to achieve ejection, either from the same or multiple pairs of electrodes. For example, 2, 3 or more rapid pulses can be employed to achieve the desired ejection of the print material as opposed to a single longer pulse. In general, any desired pulse waveform can optionally be chosen to optimize fluid flow and ejection.

Drop sizes can be individually selected on-demand. In an embodiment, drop sizes can be varied by varying the current pulse energy for each pulse (e.g., varying pulse length and/or amplitude of the current pulse). In another embodiment, multiple addressable electrode pairs (similar to that shown in FIG. 16B, with each electrode driven independently) can be employed to vary the drop volume. Thus, during operation, the current generating system can be used to send an electrical pulse between a first number of electrode pairs in ejector nozzle 108 (e.g., one or more of electrode pairs 110a, 112a; 110b, 112b and 110c, 112c of FIG. 16B) to eject a first droplet volume, and subsequently send an electrical pulse between a second number of the electrode pairs to eject a second droplet volume that is different than the first droplet volume, the first number of electrode pairs being different than the second number of electrode pairs. Thus, in this process, the drop size of the print material ejected in the first ejection would be different than the drop size of the print material ejected in the second ejection.

The droplet size per ejection can be selected based on various factors, including the desired size of details in the object to be printed, the particular properties of the print material (e.g., thermal transfer and expansion properties), properties of the current pulse provided to the print material, nozzle size and so forth. Droplets may generally have a diameter size that is as small as the inner diameter of the ejector nozzle 108 but could potentially have significantly larger diameters if longer lengths of print material (e.g., liquid filament) are ejected during a single ejection. In an embodiment, the length of print material ejected in a single ejection (e.g., using a single pulse) is about 1 times to about 10 times the inner width (e.g., diameter) of the print nozzle 108 each time the print material is jetted.

In an embodiment, the ejector conduit 106 further comprises a second electrode pair (e.g., electrodes 144, 145 of FIG. 4A) positioned upstream of the ejector nozzle. The flux region 133 extends to print material 104 disposed in a reload region 170 of the passageway proximate the second electrode pair so as to allow an electromagnetic force, such as a Lorentz force, to be generated between the electrodes of the second electrode pair for controlling flow of the print material. In an embodiment, advancing the print material 104 in passageway 106C comprises flowing electrical current through the second electrode pair, thereby separating a reload portion of the print material 104 disposed within the reload region 170 from a remaining portion of the print material 104 positioned upstream of the second electrode pair and further flowing the reload portion of the print material into the ejector nozzle. In this way, a desired amount of print material for ejection can be sent to the ejector nozzle 108.

In an embodiment, the ejector conduit 106 further comprises a third electrode pair (electrodes 146, 147 of FIG. 2 and FIG. 4A) positioned upstream of the second electrode pair (electrodes 144, 145). The flux region 133 extends to print material 104 disposed proximate the third electrode pair so as to allow an electromagnetic force (e.g., a Lorentz force) to be generated between the electrodes of the second electrode pair for controlling flow of the print material. In an embodiment, where the second electrode pair is employed to reload the ejector nozzle 108, as described above, advancing the print material 104 can include flowing electrical current through the third electrode pair (146, 147) to thereby flow print material positioned upstream of the second electrode pair (144, 145) into the reload region 170. This can occur simultaneously as, or after, the second electrode pair (144, 145) pushes a reload portion of the print material to exit the reload region 170 and refill the nozzle 108.

In an embodiment, advancing the print material can include flowing electrical current through the third electrode pair (146, 147) to thereby cause a portion of the print material 104 positioned upstream of the second electrode pair (144, 145) to either i) stop flowing or ii) flow in a direction away from the reload region 170 (FIG. 4A). This can occur simultaneously as the second electrode pair (144, 145) generates an electromagnetic force (e.g., a Lorentz force) to push the print material in the reload region into the ejector nozzle 108. By using the second electrode pair to force material into the nozzle 108 at the same time the third electrode pair (146, 147) stops or reverses the flow of print material upstream of the reload region 170, a reload portion of the print material can be separated from a remaining upstream portion of the print material. Further, by controlling current pulse amplitudes and/or current pulse lengths to the second and third electrode pairs, a measured volume of print material can be separated as the reload portion and transferred to the first electrode pair (110, 112) in ejector nozzle 108. There, on demand, the print material can be accelerated to a desired speed and ejected.

After ejection of the print material 104, additional print material 104 can be advanced to refill the ejector nozzle or nozzles 108 and then the current pulse is repeated to eject additional print material. This process of i) advancing the print material to refill the nozzles 108 (e.g., by using additional electrode pairs to generate a Lorentz force and/or by employing a hydrostatic pressure or other method to flow the print material) and ii) providing a current pulse to electrodes 110, 112 in the ejector nozzle 108 to then eject the print material, can be repeated any number of times as desired for each of the ejector nozzles 108 in the array until the printing is complete, thereby forming a 2D or 3D object. During the printing, the ejection of print material 104 can occur from a single ejector nozzle 108 in the array at a time, simultaneously from two or more ejector nozzles 108, and/or simultaneously from all of the ejector nozzles 108 in the array, as desired to accomplish the particular printing process being carried out.

In an embodiment, ejecting at least a portion of the print material comprises flowing a sheath gas proximate the ejector nozzle, the sheath gas comprising one or both of an inert gas and a reducing gas. An example of employing a sheath gas is illustrated by the arrows 210 in FIGS. 1 and 20. The sheath gas flow can be accomplished in any suitable manner, such as, for example, by flowing the sheath gas through sheath gas vents 212 positioned within or proximate to the printer jetting mechanism 100, such as in the array 107 and/or the ejector housing 120. In an embodiment, the sheath gas is maintained at a desired temperature so as to avoid cooling the print material prior to deposition. For example, the sheath gas temperature can be at or above the melting point of the print material. In this manner, the print material can be maintained in a molten state until deposition on the substrate occurs, if desired. In an embodiment, the sheath gas can be moving at approximately the same velocity, and in approximately the same direction, as the droplets when they are ejected.

The magnetic field can be provided by any suitable source, including any of the magnetic field sources described herein. In an embodiment, the magnetic field source comprises a permanent magnet. The method can include cooling the permanent magnet to reduce the temperature of the magnet to be below the Curie temperature, or to be within a suggested range of operating temperatures, in order to avoid large reductions in magnetic field strength. For example, the magnet can be cooled so as to be maintained at a temperature below 200° C., such as a temperature ranging from about 0° C. to about 160° C. The cooling of the magnet can occur for a magnet 132 employed either with or without a flux guide 134, as described herein. Any suitable cooling techniques can be employed, such as by circulating a cooling fluid proximate the magnet (e.g., by flowing the cooling fluid through conduits (not shown) that are positioned to cool a space surrounding the magnet or by flowing the cooling fluid across a surface of the magnet or flowing coolant through the interior of the magnet or flux guide.) The cooling fluid can be circulated using any suitable mechanical system, such as a pump, fan, blower and/or compressor, to cool the magnet. In an embodiment, the flux guide can be cooled to a desired operating temperature range, instead of or in addition to, cooling the magnet. Any of the techniques and/or cooling systems listed herein for cooling the magnet can be employed for cooling the flux guide.

A method for mixing separate print materials and ejecting the mixed print materials to form, for example, metal alloys will now be described. The method employs an ejector device 300 comprising an ejector conduit 306, as shown, for example, in FIGS. 12 to 15, and as described herein. A plurality of ejector conduits can be employed in the case of an array, as described for other ejector devices herein. In an embodiment, the method comprises supplying a first print material 104A (FIG. 14) that is electrically conductive to a first passageway 306C (FIG. 12) that fluidly connects a first end 306A of an ejector conduit 306 to a conduit junction 306D. The first end is configured to accept the first print material from a feeder mechanism, such as from reservoir 140 (FIG. 1), as an example. The method further includes supplying a second print material 104B (FIG. 14) that is electrically conductive to a second passageway 306E that fluidly connects a second end 306B of the ejector conduit 306 to the conduit junction 306D. The second end 306B is configured to accept the second print material 104B.

The first print material 104A and the second print material 104B are flowed to the conduit junction 306D, where the flows converge and mixing occurs, using respective current pulses to force desired amounts of each material into the common receiving conduit junction 306D. A first amount of the first print material 104A and a second amount of the second print material 104B are mixed to provide a third, mixed print material 104C. An electromagnetic force (e.g., a Lorentz force) is then generated to eject a droplet of the mixed print material 104C from the ejector nozzle 108 onto, for example, a print substrate. The process of flowing and mixing the print materials and generating of the electromagnetic force is repeated to eject additional droplets of the print material to form a three-dimensional object on the print substrate.

As described herein for other ejector nozzles, the ejector nozzle 108 comprises a first electrode 110 and a second electrode 112 that form a first electrode pair. Generating the electromagnetic force comprises providing a flux region 133 (e.g., as shown by dotted lines in FIG. 14) and flowing a current pulse between the first electrode 110 and the second electrode 112 in the flux region 133.

In an embodiment, the ejector conduit 106 further comprises a second electrode pair (e.g., electrodes 308 and 310) positioned in the first passageway 306C and a third electrode pair (e.g., electrodes 312 and 314) positioned in the second passageway 306E. The flux region 133 can extend to print material 104 disposed in a first reload region 170A (FIG. 12) of the first passageway 306C proximate the second electrode pair and to a second reload region 170B of the second passageway 306E proximate the third electrode pair. The first amount of the first print material 104A flowed to conduit junction 306D can be controlled by flowing electric current having a first current pulse through the second electrode pair. Similarly, the second amount of the second print material 104B flowed to conduit junction 306D can be controlled by flowing electric current having a second current pulse through the third electrode pair.

In an embodiment, controlling the first amount of the first print material 104A further comprises separating the first amount of the first print material 104A disposed within the first passageway 306C from a remaining portion of the print material positioned upstream of the second electrode pair (308, 310). Similarly, controlling the second amount of the second print material 104B comprises separating the second amount of the second print material 104B disposed within the second passageway 306E from a remaining portion of the second print material 104B positioned upstream of the third electrode pair (312, 314). The separating of the first amount and second amount of the print material 104A, 104B can occur prior to mixing the print materials.

In an embodiment, the ejector conduit 106 further comprises a fourth electrode pair (e.g., electrodes 310, 316) positioned upstream of the second electrode pair (e.g., electrodes 308, 310). A fifth electrode pair (e.g., electrodes 314, 320) positioned upstream of the third electrode pair (e.g., electrodes 312, 314). The flux region 133 extends to print material 104 disposed proximate the fourth and fifth electrode pairs, as shown for example, in FIG. 14.

The fourth electrode pair (310, 316) and fifth electrode pair (314, 320) can be employed to control flow of portions of the print material in passageways 306C and 306E, respectively. For example, to independently control flow print material from the feeder mechanism 113 (e.g., reservoir 140) to the second electrode pair (308, 310) and/or third electrode pair (312 314) and/or to independently control amounts of reload portions of the print materials 104A, 104B and/or separate reload portions when employed in conjunction with the second electrode pair (308, 310) and third electrode pair (312, 314), similarly as described herein for the second electrode pair (144, 145) and third electrode pair (146, 147) of FIG. 4A. For example, the method can comprise flowing electrical current having a third current pulse through the fourth electrode pair (310, 316) to thereby control the flow of a portion of the first print material positioned upstream of the second electrode pair (308, 310) to either i) flow print material to the reload regions 170A, ii) stop flowing print material or iii) flow print material in a direction away from the reload region 170A during the separating of the reload portion from the first print material 104A remaining upstream of the reload portion; and flowing electrical current having a fourth current pulse through the fifth electrode pair (314, 320) to thereby control the flow of the second print material positioned upstream of the third electrode pair (312, 314) to either i) flow print material to the reload regions 170B, ii) stop flowing print material, or iii) flow print material in a direction away from the reload region 170B during the separating of the reload portion from the second print material 104B remaining upstream of the reload portion.

The first current pulse flowed to the second electrode pair (e.g., 308, 310) can have a first pulse amplitude and first pulse length. The second current pulse flowed to the third electrode pair (e.g., 312, 314) can have a second pulse amplitude and second pulse length. The third current pulse flowed to the fourth electrode pair (e.g., 310, 316) can have a third pulse amplitude and third pulse length. The fourth current pulse flowed to the fifth electrode pair (e.g., 314, 320) can have a fourth pulse amplitude and fourth pulse length. Each of the first, second, third and fourth pulse amplitudes and each of the first, second, third and fourth pulse lengths can independently be chosen to be the same or different than pulse amplitudes and pulse lengths sent to the other electrode pairs (e.g., the amplitude and/or length of the first current pulse can be the same or different than the amplitude and/or length of the second, third and/or fourth current pulses). By selecting the amplitude and pulse length of the current pulses to the second, third, fourth and fifth electrode pairs, the amount of each print material 104A and 104B that is separated as the reload portion in the reload regions 170A and 170B can be independently controlled. In this manner, different amounts of each print material 104A and 104B can be mixed and ejected to get alloys comprising any desired ratio of the print materials. Further, alloy structures with graded metal concentrations and/or various different alloy concentrations can be printed. It would also be possible to eject droplets comprising solely the first print material 104A or the second print material 104B, as desired. Thus, a first droplet of ejected material can be a print material 104A, a print material 104B or a mixture of print material 104A and 104B, and a second droplet ejected from the same ejector conduit 306 can be a print material 104A, a print material 104B or a mixture of print material 104A and 104B, wherein the concentrations of print material 104A and 104B in the first droplet are different than in the second droplet.

Print materials 104A and 104B can each be independently chosen from any of the print materials taught herein, as long as both print materials are molten at the desired operating temperatures. In an embodiment, the first print material is a first metal and the second print material is a second metal, the first metal and the second metal being different. As examples, both the first metal and the second metal can independently be chosen from tin, tin alloys, lead, lead alloys (e.g., solder comprising one or both of tin and lead), aluminum, aluminum alloys (e.g., 1000 series, 2000 series, 3000 series, 4000 series, 5000 series, 6000 series, such as 6061 and 6063, and 7000 series aluminum alloys), magnesium, magnesium alloys, iron, iron alloys (e.g., steel), copper, copper alloys (e.g., zinc), nickel, nickel alloys, titanium, titanium alloys, silver and silver alloys. The resulting mixed print material 104C (FIG. 14) that is printed (sometimes referred to herein as a third print material) is an alloy of the first metal and the second metal.

In any of the methods of the present disclosure, the printer jetting mechanism can operate at ejector nozzle temperatures that are about the melting temperature of the print material 104 or higher. For example, the nozzle temperatures can range from about 50° C. to about 3000° C., and for many metals will be above about 500° C., such as about 500° C. to about 2000° C., about 600° C. to about 1500° C., or about 600° C. to about 1000° C. In the case of print materials 104 that comprise refractory material, the nozzle temperatures can range, for example, from about 1000° C. to about 3000° C., such as about 1200° C. to about 3000° C., or about 1400° C. to about 2500° C., or about 1700° C. to about 2500° C., or about 2000° C. to about 2500° C.

In any of the methods of the present disclosure, the print material 104 is ejected from the ejector nozzles 108 as a liquid in the form of droplets. The droplets can optionally have a relatively small droplet size, which can allow for printing of fine details. As examples, droplet diameters can range from about 0.001 mm to about 0.2 mm, about 0.005 mm to about 0.1 mm, about 0.01 mm to about 0.05 mm. Droplets with larger diameters can also potentially be formed if desired, such as droplets of about 0.5 mm, about 1 mm, about 2 mm or larger. In an embodiment, the droplet diameters are less than 100 microns (0.1 mm), such as 90 microns, 80 microns, or 70 microns or less.

The methods of the present disclosure can be employed to deposit print material 104 from any number of ejector conduits 106 simultaneously or separately as desired. The method can also allow for the deposition of small amounts of material from any one ejector nozzle 108 while still providing for a relatively high overall deposition rate due to the potentially large number of ejector conduits 106 in the array and the potentially high rate of ejection from each ejector conduit 106.

Figure 20:
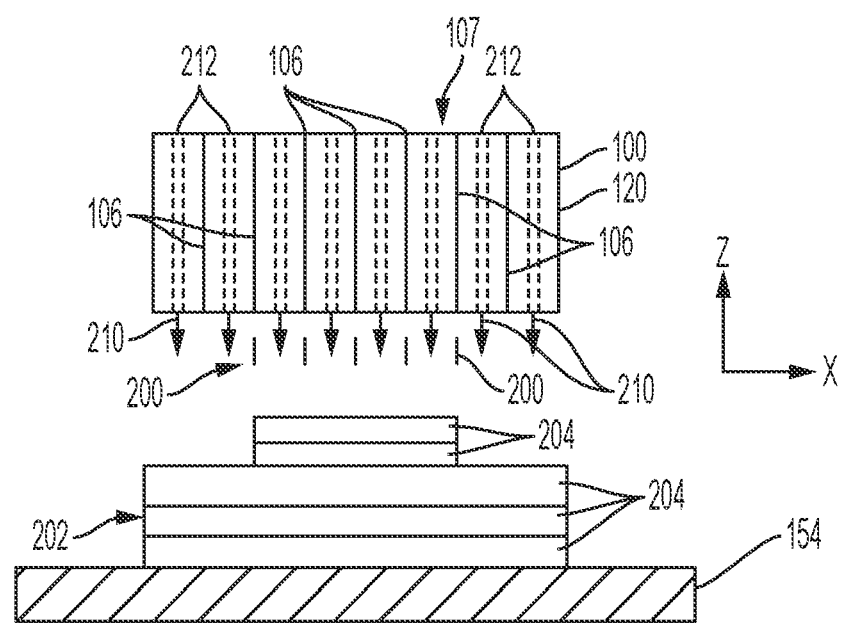
FIG. 20 illustrates a schematic side view of a printer jetting mechanism comprising a plurality of ejector conduits simultaneously ejecting droplets to print a 3D object on a print substrate, according to an embodiment of the present disclosure.

The printer jetting mechanisms for jetting print material described herein can be employed in various printing methods. For example, any of the printer jetting mechanisms described herein can be employed in a method of three-dimensional printing in which print material 104 (FIG. 1) is ejected from the ejector nozzles 108 and deposited onto a print substrate 154 (FIGS. 19 and 20), such as a build plate. One or both of the print substrate 154 and the array 107 of ejector nozzles 108 can move relative to each other in three dimensions during printing (e.g., in directions along an x-axis, y-axis and z-axis) in any suitable manner, thereby forming a 3D object. As is well known in the art, 3D printing comprises printing multiple droplets or layers of material, where each droplet or layer can be stacked one on the other, until a desired thickness of the 3D object is realized. FIG. 20 illustrates an example of a printer jetting mechanism 100 comprising a plurality of ejector conduits 106 simultaneously ejecting droplets 200 to print a 3D object 202 on a print substrate 154. Many layers 204 of droplets 200 may be deposited, one layer or droplet on the next, until the 3D object 202 is completed. As would be readily understood by one of ordinary skill in the art, the droplets and/or layers can be stacked in any desired order, so that, for example, a first underlying layer 204 may or may not be completed before beginning subsequent layers and there may or may not be a recognizable layering pattern to the order of material deposition. Rather, the droplets, layers and/or portions of layers can be stacked in any desired order to complete the 3D object.

An embodiment of the present disclosure is directed to a method of making ejector devices comprising one or more ejector conduits, such as arrays of ejector conduits, as described herein. The method comprises providing a substrate, such as any of the substrates described herein. Any of the ejector conduits as described herein are formed on the substrate. This can include forming one or more (e.g., a plurality of) electrode pairs on the substrate, each of the electrode pairs comprising a first electrode and a second electrode. One or more (e.g., a plurality of) open passageways are formed for flowing a print material. Each of the open passageways have a first end for receiving the print material and a second end for ejecting the print material. A first electrode and a second electrode of at least one electrode pair are exposed in the second end of the open passageway to form an ejector nozzle, as described herein.

Figure 23B:
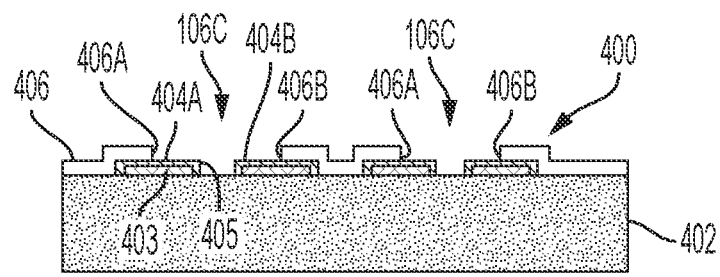
FIG. 23B illustrates a cross-sectional, side view of a partially made array of ejector conduits, according to an embodiment of the present disclosure.
Figure 23C:
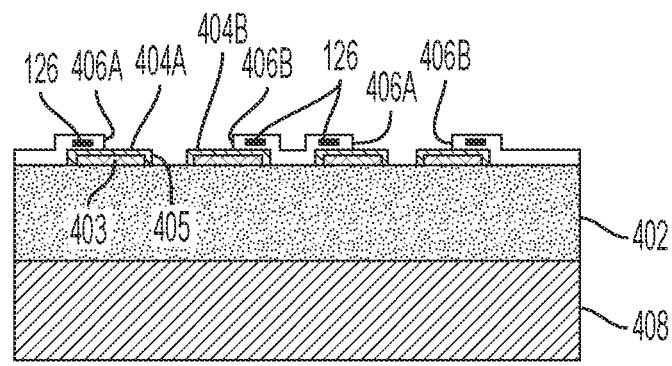
FIG. 23C illustrates a cross-sectional, side view of an array of ejector conduits, according to an embodiment of the present disclosure.

FIGS. 23A to 23C illustrate a method of forming ejector devices, according to an embodiment of the present disclosure. In an embodiment, the ejector devices are MEMS. Referring to FIG. 23A, a substrate 402 is provided. The substrate can comprise any of the substrate materials described herein. In an embodiment, the substrate comprises an insulating material. A plurality of electrode pairs 404 are formed by, for example, blanket depositing a conductive layer on the substrate and patterning the conductive layer to form a patterned conductive layer 403 of a first electrode 404A and a second electrode 404B for each of the plurality of electrode pairs 404. Any suitable photolithographic techniques can be employed to pattern the conductive layer. Alternatively, the electrode pairs 404 can be selectively deposited in the desired electrode pattern on the substrate. The patterned conductive layer comprises a first metal, such as, for example, aluminum, aluminum alloys, copper, copper alloys, or any of the other metals taught herein for use as electrodes.

Optionally, the first electrode 404A and second electrode 404B can further comprises a passivation layer 405. The passivation layer 405 can comprise a second, corrosion resistant metal that is different than the first metal and that is resistant to chemical reaction with the print material (e.g., molten metal) to be jetted. The passivation layer 405 can be formed by any suitable method, such as electroplating or other deposition techniques. For example, iron can be electroplated on the electrode pairs to provide a passivation layer. Such passivation layers can optionally be applied to any of the electrodes (e.g., electrodes 110, 112, 144, 145, 146, 147, 504A, 504B, 604A, 604B and other electrodes) described herein.

In an embodiment, the first electrodes 404A and the second electrodes 404B each have a width, $W_1$, and a height, $H_1$, the width being greater than the height. Alternatively, the height can be greater than the width. $W_1$ and $H_1$ include all conductive layers of the electrodes, including the passivation layer 405 if formed.

Referring to FIG. 23B, first sidewalls 406A are formed on the first electrodes 404A and second sidewalls 406B are formed on the second electrodes 404B to form the plurality of passageways 106C. First electrode 404A and the second electrode 404B are raised above the substrate 402, so as to also form sidewall portions of the passageways 106C.

In an embodiment, forming the sidewalls 406A and 406B of the plurality of open passageways 106C comprises depositing a sidewall layer 406 on the plurality of electrode pairs. The sidewall layer 406 can be blanket deposited and then patterned by photolithographic techniques to form a plurality of channels in the sidewall layer 406, where the channels comprise the first sidewalls 406A proximate the first electrodes 404A and the second sidewalls 406B proximate the second electrodes 404B. The distance between the first sidewalls 406A and the second sidewalls 406B determines a width of the open passageways. A heater mechanism 126 can optionally be embedded in the sidewall layer 406 and/or the substrate 402 using well known techniques. Any of the heater mechanisms 126 disclosed herein can be employed. For example, sidewall layer 406 can be deposited as two thinner, stacked insulating layers, and a conductive heating element can be formed between the stacked insulating layers to thereby embed the conductive heating element in the sidewall layer 406. Any suitable techniques, such as well known deposition, photolithographic and etching techniques, can be employed to form the conductive heating element.

In an embodiment, the ejector conduits of FIGS. 23A to 23C can be made using printed circuit board ("PCB") fabrication techniques. PCB techniques are scalable and relatively inexpensive approaches to fabricating such arrays. For example, the substrate 402 can comprise a flexible, insulating substrate such a polyimide, or other fiber-free PCB substrate. The patterned conductive layer 403 for the electrodes 404A, 404B comprises a metal that can be deposited at relatively low temperatures that are suitable for PCB substrates, such as copper or aluminum. The passivation layer 405 is optionally applied by, for example, electroplating the copper or aluminum with a flash of iron or other metal that does not chemically interact at operating temperatures, or is resistant to chemical interaction at operating temperatures, with the print material to be jetted. The sidewall layer 406 for making the sidewalls 406A, 406B can be, for example, a solder mask that is deposited and photolithographically patterned. The flexible substrate 402 can be laminated to a carrier substrate 408, such as, for example a substrate comprising a fiber-reinforced material (e.g., FR4), at any time during the fabrication process.

In an embodiment, the relatively wide and thin electrodes 404A, 404B of FIGS. 23A to 23C carry the molten metal confined by insulating sidewalls 406A, 406B of sidewall layer 406. The sidewall layer 406 can comprise any suitable insulating material, including any of the insulating materials, or combination of insulating materials, described herein, such as any of the insulating materials described above for sidewall layer 143. The insulating material can optionally be selected to have a desired contact angle with the print material so as to provide confinement and/or capillary benefits, as discussed herein. If desired, some or all of the electrodes 404A and 404B can be routed via sub-layers in a multi-layer PCB stack (not shown), as is generally well known in the art.

Figure 24A:
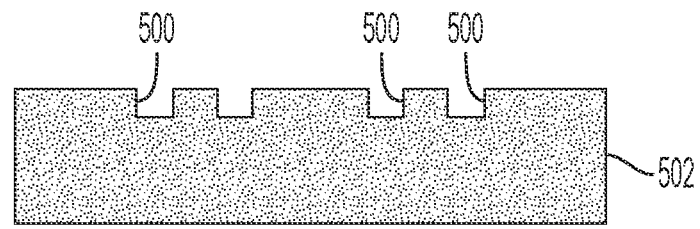
FIG. 24A illustrates a cross-sectional, side view of a partially made array of ejector conduits, according to an embodiment of the present disclosure.
Figure 24B:
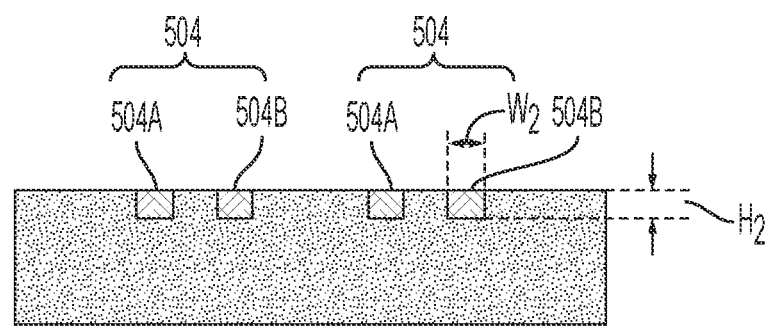
FIG. 24B illustrates a cross-sectional, side view of a partially made array of ejector conduits, according to an embodiment of the present disclosure.
Figure 24C:
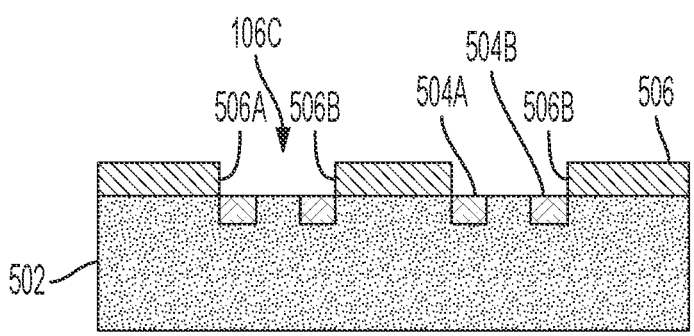
FIG. 24C illustrates a cross-sectional, side view of an array of ejector conduits, according to an embodiment of the present disclosure.

Another example of a method of making the ejector devices of the present disclosure is illustrated in FIGS. 24A to 24C. In an embodiment, the ejector devices are MEMS. The method comprises etching a plurality of trenches 500 in the substrate 502. The substrate 502 can comprise any suitable substrate material described herein, such as a material chosen from semiconductors (e.g., compound semiconductors or group IV semiconductors, such as silicon); insulating materials, such as glass and ceramics, or combinations thereof. It is also possible to use lower temperature substrates, such as polymer substrates (e.g., FR4 or polyimide) if the print materials 104 will have low melting points, such as below 300° C. In an embodiment, the substrate comprises a buried insulating layer, such as buried insulating layer 608 of a silicon-on-insulator ("SOI") substrate, as shown in FIG. 25A.

The trenches 500 can be formed by any suitable method. An example method includes employing photolithography to pattern the substrate, followed by etching the substrate using, for example, dry reactive ion etching ("DRIE") or wet etching techniques. If an SOI substate is employed, the buried insulating layer can optionally act as an etch stop and either form the bottom of the trenches or be removed.

The trenches 500 are filled with a conductive material to form the electrodes 504A and 504B for each of the plurality of electrode pairs 504. The conductive material comprises a metal, such as any of the metals described herein for use as electrodes. In an embodiment, the electrodes 504A and 504B each have a width, $W_2$, and a height, $H_2$, the width being less than the height. Narrower, thicker electrodes can enable higher linear densities of ejectors. The metal can be deposited in the trenches using any suitable techniques. Examples include filling the trenches with copper using a damascene process comprising electroplating, or depositing the metal layer by chemical vapor deposition ("CVD") followed by chemical mechanical planarization ("CMP").

Referring to FIG. 24C, first sidewalls 506A are formed proximate the first electrodes 504A and second sidewalls 506B are formed proximate the second electrodes 504B to form the plurality of passageways. In an embodiment, forming the first sidewalls 506A and second sidewalls 506B of the plurality of open passageways comprises: depositing a sidewall layer 506 on the plurality of electrode pairs 504. The sidewall layer can be blanket deposited and then patterned by photolithographic techniques to form a plurality of channels in the sidewall layer 506, where the channels comprise the first sidewalls 506A proximate the first electrodes 504A and the second sidewalls 506B proximate the second electrodes 504B. The distance between the first sidewalls 506A and the second sidewalls 506B of the channels determines a width of the open passageways 106C. A heater mechanism, such any of the heater mechanisms taught herein, can be embedded in the insulating sidewall layers comprising sidewalls 506A, 506B or the substrate 502, similarly as described herein for the ejector device of FIG. 23C.

The insulating material for the sidewall layers is selected to be refractory and electrically insulating. The sidewall layer 506 can comprise any suitable insulating material, including any of the insulating materials, or combination of insulating materials, described herein, such as any of the materials described above for sidewall layer 143. The insulating material can optionally be selected to have a desired contact angle with the print material so as to provide confinement and/or capillary benefits, as discussed herein.

Figure 25B:
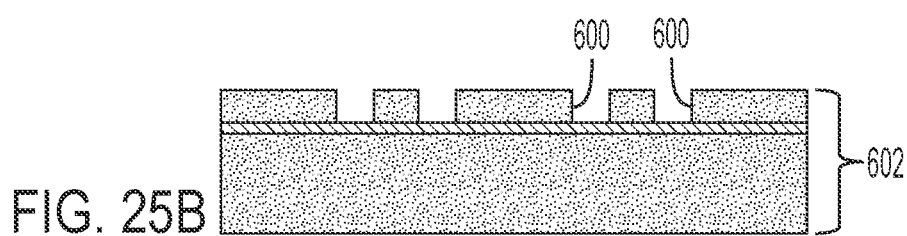
FIG. 25B illustrates a cross-sectional, side view of a partially made array of ejector conduits, according to an embodiment of the present disclosure.
Figure 25C:
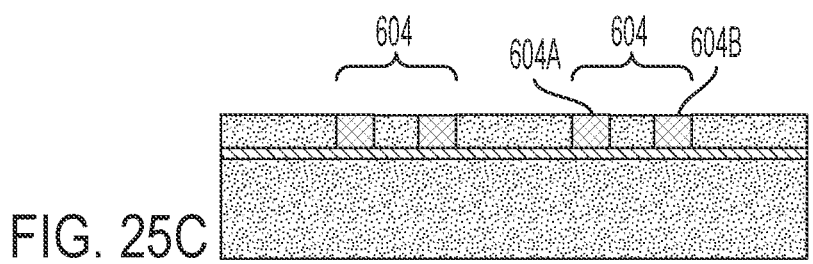
FIG. 25C illustrates a cross-sectional, side view of a partially made array of ejector conduits, according to an embodiment of the present disclosure.
Figure 25D:
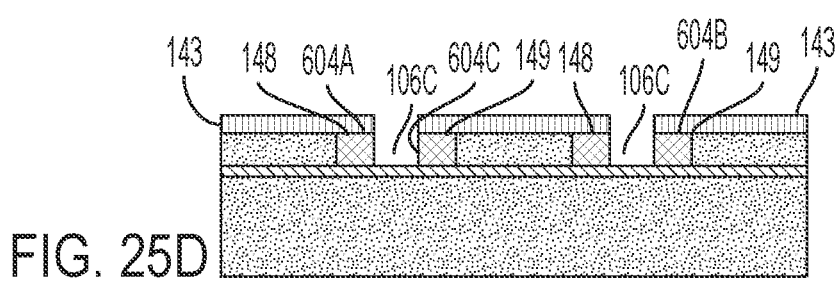
FIG. 25D illustrates a cross-sectional, side view of a partially made array of ejector conduits, according to an embodiment of the present disclosure.
Figure 25E:
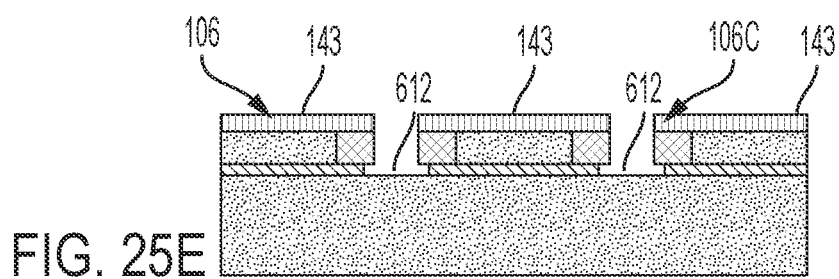
FIG. 25E illustrates a cross-sectional, side view of an array of ejector conduits, according to an embodiment of the present disclosure.

FIGS. 25A to 25E illustrate yet another method for forming the ejector devices of the present disclosure. In an embodiment, the ejector devices are MEMS. As illustrated in FIGS. 25A to 25C, trenches 600 are formed in a substrate 602. The trenches are filled with a metal to form a plurality of electrode pairs that comprise first electrodes 604A and second electrodes 604B. The substrate 602, the methods for forming the trenches 600 and the method of forming the electrode pairs 604 can be the same as described above with respect to FIGS. 24A and 24B, except that the electrodes are configured to hold the print material within the metal rails, rather than the metal riding above the rails. This can be accomplished by forming trenches 600 so as to have a relatively high aspect ratio, such as, for example, an aspect ratio ranging from about 1/1 to about 30/1, about 2/1 to about 25/1, or about 10/1 to about 20/1. The high aspect ratio of the trenches 600 can allow the subsequently formed electrode pairs 604 to form relatively high sidewalls 604C, while still allowing for a low electrode series resistance.

In an example, the trenches 600 are formed using a silicon-on-insulator substrate having a top Si layer 603 thickness that corresponds to a desired depth of the trenches. Example thicknesses range from about 10 microns to about 1000 microns, about 25 microns to about 500 microns, or about 50 microns. The trenches can be patterned using, for example, photolithographic techniques and then etched using DRIE to have the desired relatively high aspect ratio side walls. The etching can stop at the buried oxide layer 608. The electrodes 604A, 604B can then be formed in the trenches by, for example, electroplating of the metal followed by chemical mechanical planarization (CMP). Such patterning, etching, electroplating and CMP methods can also optionally be employed in a dual damascene process to form vias for a multi-layer electrode configuration (not shown). Multi-layer metallization structures are generally well known and can readily be employed by one of ordinary skill in the art to form the electrodes of the present disclosure.

Following formation of the electrodes 604A and 604B, the silicon portions of the substrate 602 between the electrode pairs are removed by any suitable process to form open passageways 106C, as illustrated in FIG. 25D. The removal process can include patterning the substrate using photolithography techniques to expose only the silicon regions of substrate 602 to be removed, followed by an etching process, such as a DRIE or wet etching process to remove the silicon regions. The buried insulator layer 608 can optionally act as an etch stop during this etching process. Optionally, a sidewall layer 143 is deposited prior to removal of the silicon portions between the electrodes. Sidewall layer 143 can comprise any suitable insulating material, such as any of the insulating materials, or combinations of insulating materials, described herein. The sidewall layer 143 can be patterned using the same or a different process as is employed to remove the silicon regions.

Optionally, a portion of buried insulator layer 608 can also be removed to form gaps 612 as part of the passageways 106C, as shown in FIG. 25E. The buried oxide can optionally be etched slightly under electrodes 604A and 604B, thereby resulting in the electrodes being slightly proud of the underlying oxide layer, as shown in FIG. 25E. The portions of buried insulator layer 608 can be removed using any suitable etching process, such as, for example, a selective oxide etch (e.g., a buffered oxide etch), as is well known in the art. Optionally removing the buried insulator layer 608 from the bottom of trenches 600 can better allow the liquid metal to be suspended between the electrodes 604A and 604B, as well as other portions of the rails 148 and 149.

The ejector conduits disclosed herein can be fabricated and used as open channel structures. For example, the ejector conduits 106 made by the processes of FIGS. 23A to 23C, 24A to 24C and 25A to 25E, as described herein, can be employed for making open channel devices having at least one side that is open to the atmosphere along the length of the passageway. Alternatively, the ejector conduits can comprise closed channels (e.g., as shown in FIG. 11) by attaching two open channel structures together face to face, as will be discussed in greater detail below. The attaching can be accomplished by any suitable technique, such as, for example, bonding, clamping, or fastening together using any type of fastener. In another embodiment, a closed channel device can be formed by capping a single open channel array structure with a plate comprising, for example, a ceramic, glass or other insulating material. For example, the bottom array 107 can be capped with the interposer layer 250 as shown in FIG. 11, but without the top array 107. The term "closed channels" refers to passageways 106C that are enclosed on all sides along the length of the passageway 106C, while remaining open, for example, at the first end 106A and second end 106B, to allow for receiving and ejecting print material 104. FIG. 11 illustrates an example of such a closed channel configuration.

In an embodiment, a method for forming a closed channel array of ejector conduits comprises forming a first array 107 of ejector conduits comprising a first plurality of open passageways 106C and forming a second array 107 of ejector conduits comprising a second plurality of open passageways 106C. The first array and the second array can be formed by any of the methods described herein for making such arrays. Examples of such arrays 107 having open ejector conduits are illustrated in FIGS. 3, 9 and 10, as well as the ejector conduit of FIGS. 12 and 13. The method further comprises attaching the first array 107 of ejector conduits to the second array 107 of ejector conduits, thereby enclosing the first plurality of open passageways to form enclosed first passageways 106C-1 (FIG. 11) and enclosing the second plurality of open passageways to form enclosed second passageways 106C-2. As also shown in FIG. 11, the first and second arrays of ejector conduits are oriented to face each other so that the first enclosed passageways 106C-1 are proximate to the second enclosed passageways 106C-2. The method optionally comprises including an interposer layer 250 between the first array 107 of ejector conduits and the second array 107 of ejector conduits.

In an embodiment, the attaching of the arrays can comprise employing removable fasteners 252 that allow the first array of ejector conduits to be easily detached from the second array of ejector conduits after the attaching process is carried out. Examples of removable fasteners include screws or clamps, which could optionally be employed with alignment pins or other lithographically complementary patterned features that allow the first array and the second array to be aligned as desired when fastened together, with or without the interposer layer 250. This configuration achieves the benefits of 3D capillary behavior, including the ability to pressurize the print material in the conduits for potentially improved flow. At the same time this configuration allows for the advantages of open channel architectures, such as easy cleanability, when the closed array configuration is disassembled into the first open array and the second open array. Alternatively, if the advantages of open channel architectures are not desired, such 3D configurations can be fabricated as monolithic structures, such as by permanently bonding the first array to the second array.

The methods described herein, such as any of the methods of making either open channel ejector conduits or closed channel ejector conduits, can be employed to make any of the ejector conduits described herein. For example, the methods can be used to make any of the ejector conduits 106 described herein having a single electrode pair, as well as ejector conduits have 2 to 5 electrode pairs, including the ejector conduits used for mixing two or more print materials.

While the ejector devices of the present disclosure have generally been described as comprising arrays of ejector conduits, it is contemplated that any of the ejector devices described herein can comprise a single ejector conduit or a plurality of ejector conduits. Further, any of the methods of making ejector devices described herein can be applied for making an ejector device comprising either a single ejector conduit or a plurality of ejector conduits on a substrate. Similarly, ejector devices comprising only a single ejector conduit can be employed in any of the printers or printer jetting mechanisms described herein and/or can be employed in any of the methods of printing or methods of ejecting print material described herein.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A three-dimensional ("3D") printer, comprising:
an ejector device comprising a substrate and a plurality of ejector conduits on the substrate, the ejector conduits being arranged in an array, each ejector conduit comprising:
a first end positioned to accept a print material,
a second end comprising an ejector nozzle, the ejector nozzle comprising a first electrode and a second electrode, and
a passageway for allowing the print material to flow from the first end to the second end, at least one surface of the first electrode being exposed in the passageway and at least one surface of the second electrode being exposed in the passageway;
a current pulse generating system in electrical connection with the first electrode and the second electrode of each one of the plurality of ejector conduits;
a magnetic field source proximate the second end of each one of the plurality of ejector conduits so as to generate a flux region disposed within the ejector nozzle of each one of the plurality of ejector conduits during operation of the 3D printer; and
a positioning system for controlling the relative position of the ejector device with respect to a print substrate in a manner that would allow the print substrate to receive the print material jettable from the ejector nozzle of each one of the plurality of ejector conduits during operation of the 3D printer.

2. The three-dimensional printer of claim 1, wherein one or more of the plurality of ejector conduits each comprise a third electrode and a fourth electrode, at least one surface of the third electrode being exposed in the passageway and at least one surface of the fourth electrode being exposed in the passageway, the third electrode and the fourth electrode being a second electrode pair.

3. The three-dimensional printer of claim 2, wherein one or more of the plurality of ejector conduits each comprise a fifth electrode and a sixth electrode, at least one surface of the fifth electrode being exposed in the passageway and at least one surface of the sixth electrode being exposed in the passageway, the fifth electrode and the sixth electrode being a third electrode pair.

4. The three-dimensional printer of claim 3, further comprising a first rail and a second rail, the first rail and the second rail being disposed proximate the passageway, at least a portion of the passageway being positioned between the first rail and the second rail, the first rail comprising the first electrode and optionally one or both of the third electrode and the fifth electrode and the second rail comprising the second electrode and optionally one or both of the fourth electrode and the sixth electrode.

5. The three-dimensional printer of claim 4, wherein at least a first portion of the first rail and at least a first portion of the second rail comprise at least one metal chosen from copper, copper alloys, platinum, platinum alloys, aluminum, aluminum alloys, palladium, palladium alloys, iron, iron alloys, nickel, nickel alloys, silver, silver alloys, magnesium, magnesium alloys, titanium, titanium alloys and refractory metals.

6. The three-dimensional printer of claim 4, further comprising a sidewall layer disposed proximate the first rail and the second rail, the sidewall layer being patterned to form a first sidewall and a second sidewall, a distance between the first sidewall and the second sidewall defining a width of the passageway.

7. The three-dimensional printer of claim 6, wherein the sidewall layer comprises a material chosen from metal oxides, metal oxynitrides, metal nitrides, metal carbides, polymers and combinations thereof.

8. The three-dimensional printer of claim 1, wherein the substrate comprises at least one material chosen from insulating materials and semiconductor materials.

9. The three-dimensional printer of claim 1, wherein the passageway is an open channel having at least one side that is open to the atmosphere along the length of the passageway.

10. The three-dimensional printer of claim 1, wherein the passageway is a closed channel that is enclosed on all sides along the length of the passageway.

11. The three-dimensional printer of claim 1, further comprising a heating mechanism for melting a solid print material into a liquid print material and a reservoir for holding the liquid print material, the reservoir being in fluid connection with the plurality of ejector conduits.

12. The three-dimensional printer of claim 1, wherein the magnetic field source is configured to provide a magnetic field that is substantially perpendicular to a direction of flow of electric current through the print material.

13. The three-dimensional printer of claim 1, wherein the magnetic field source is a flux circuit comprising a magnet and a flux guide attached to the magnet, the flux guide being positioned proximate the ejector nozzle for each of the plurality of ejector conduits.

14. The three-dimensional printer of claim 1, wherein the magnetic field source comprises a permanent magnet.

15. The three-dimensional printer of claim 1, further comprising a cooling system for cooling the magnet field source.

16. The three-dimensional printer of claim 1, wherein the current pulse generating system comprises a power supply, at least one current switch and at least one controller arranged in a circuit, the controller providing variable control of one or more characteristics chosen from current amplitude and pulse length.

17. The three-dimensional printer of claim 1, wherein the ejector nozzle has an inner width ranging from about 10 microns to about 1000 microns.

18. The three-dimensional printer of claim 1, wherein the array has M columns of ejector conduits arranged on an X axis and N rows of ejector conduits arranged on a Y axis, where M is an integer ranging from 3 to 1000 and N is an integer ranging from 1 to 2.

19. The three-dimensional printer of claim 1, wherein the ejector device is a microelectromechanical system ("MEMS").

20. A printer jetting mechanism, comprising:
an ejector device comprising a substrate and an ejector conduit on the substrate, the ejector conduit comprising:
a first end positioned to accept a print material,
a second end comprising an ejector nozzle, the ejector nozzle comprising a first electrode, a second electrode, a third electrode, and a fourth electrode, wherein the first and second electrodes are a first electrode pair, and wherein the third and fourth electrodes are a second electrode pair,
a passageway for allowing the print material to flow from the first end to the second end, at least one surface of the first electrode being exposed in the passageway, least one surface of the second electrode being exposed in the passageway, at least one surface of the third electrode being exposed in the passageway, and at least one surface of the fourth electrode being exposed in the passageway;
a current pulse generating system in electrical connection with the first electrode and second electrode of the ejector conduit; and
a magnetic field source proximate the second end of the ejector conduit so as to generate a flux region disposed within the ejector nozzle during operation of the 3D printer.

21. The printer jetting mechanism of claim 20, wherein the ejector conduit comprises a fifth electrode and a sixth electrode, at least one surface of the fifth electrode being exposed in the passageway and at least one surface of the sixth electrode being exposed in the passageway, the fifth electrode and the sixth electrode being a third electrode pair.

22. The printer jetting mechanism of claim 21, further comprising a first rail and a second rail, the first rail and the second rail being disposed proximate the passageway, at least a portion of the passageway being positioned between the first rail and the second rail, the first rail comprising the first electrode and optionally one or both of the third electrode and the fifth electrode and the second rail comprising the second electrode and optionally one or both of the fourth electrode and the sixth electrode.

23. The printer jetting mechanism of claim 22, further comprising a sidewall layer disposed proximate the first rail and the second rail, the sidewall layer being patterned to form a first sidewall and a second sidewall, a distance between the first sidewall and the second sidewall defining a width of the passageway.

24. The printer jetting mechanism of claim 20, wherein the passageway is an open channel having at least one side that is open to the atmosphere along the length of the passageway.

25. The printer jetting mechanism of claim 20, wherein the passageway is a closed channel that is enclosed on all sides along the length of the passageway.

26. The printer jetting mechanism of claim 20, wherein the ejector device comprises one or more additional ejector conduits on the substrate so that a plurality of ejector conduits are disposed on the substrate, the plurality of ejector conduits being arranged in an array.

27. The printer jetting mechanism of claim 20, wherein the ejector device is a microelectromechanical system ("MEMS").

28. A 3D printer comprising the printer jetting mechanism of claim 20.

29. An ejector device comprising:
a substrate; and
an ejector conduit on the substrate, the ejector conduit comprising:
   a first end configured to accept a print material,
   a second end comprising an ejector nozzle, the ejector nozzle comprising a first electrode, a second electrode, a third electrode, and a fourth electrode, and
   a passageway for allowing the print material to flow from the first end to the second end, at least one surface of the first electrode being exposed in the passageway, at least one surface of the second electrode being exposed in the passageway, at least one surface of the third electrode being exposed in the passageway, and at least one surface of the fourth electrode being exposed in the passageway.

30. The ejector device of claim 29, wherein the ejector conduit comprises a fifth electrode and a sixth electrode, at least one surface of the fifth electrode being exposed in the passageway and at least one surface of the sixth electrode being exposed in the passageway, the fifth electrode and the sixth electrode being a third electrode pair.

31. The ejector device of claim 30, wherein the passageway is an open channel having at least one side that is open to the atmosphere along the length of the passageway.

32. The ejector device of claim 30, wherein the ejector device is a microelectromechanical system ("MEMS").

* * * * *